United States Patent
Wu et al.

(10) Patent No.: US 8,804,241 B2
(45) Date of Patent: Aug. 12, 2014

(54) METHODS FOR FORMING OPTICAL FILMS

(75) Inventors: Qihong Wu, Somerset, NJ (US); Kelvin Xu Zhang, Pine Brook, NJ (US); Shiaw-Wen Tai, Livingston, NJ (US)

(73) Assignee: Polarization Solutions, LLC, Somerset, NJ (US)

(*) Notice: Subject to any disclaimer, the term of this patent is extended or adjusted under 35 U.S.C. 154(b) by 0 days.

(21) Appl. No.: 12/946,767

(22) Filed: Nov. 15, 2010

(65) Prior Publication Data
US 2011/0255162 A1 Oct. 20, 2011

Related U.S. Application Data

(63) Continuation of application No. 12/049,965, filed on Mar. 17, 2008, now abandoned.

(51) Int. Cl.
*G02B 5/30* (2006.01)
*G02B 5/18* (2006.01)

(52) U.S. Cl.
CPC ............ *G02B 5/3058* (2013.01); *G02B 5/1809* (2013.01)
USPC ............ 359/485.05; 359/487.03; 359/489.06; 359/489.07

(58) Field of Classification Search
USPC .................................................... 359/485.05
See application file for complete search history.

(56) References Cited

U.S. PATENT DOCUMENTS

| | | | |
|---|---|---|---|
| 4,730,330 A | 3/1988 | Plihal et al. | |
| 5,340,637 A | 8/1994 | Okai et al. | |
| 5,615,041 A | 3/1997 | Field et al. | |
| 5,991,075 A * | 11/1999 | Katsuragawa et al. | .. 359/485.03 |
| 6,317,264 B1 | 11/2001 | Li et al. | |
| 6,665,119 B1 | 12/2003 | Kurtz et al. | |
| 6,713,396 B2 * | 3/2004 | Anthony | ........................ 438/694 |
| 6,873,764 B2 | 3/2005 | Maisenholder et al. | |
| 7,158,302 B2 | 1/2007 | Chiu et al. | |
| 7,466,484 B2 | 12/2008 | Mi et al. | |
| 2005/0045799 A1 | 3/2005 | Deng et al. | |
| 2006/0215263 A1 | 9/2006 | Mi et al. | |
| 2010/0072170 A1* | 3/2010 | Wu et al. | .......................... 216/13 |
| 2012/0031487 A1* | 2/2012 | Kuang et al. | ................... 136/256 |

FOREIGN PATENT DOCUMENTS

JP 2005-202104 7/2005
KR 10-2005-0017871 2/2005

OTHER PUBLICATIONS

Li., X., et al., "Large Area, 38nm Half-Pitch Grating Fabrication by Using Atomic Spacer Lithography from Aluminum Wire Grids", Nano Letter, 2006, vol. 6, No. 12, pp. 2723-2727.

* cited by examiner

*Primary Examiner* — Arnel C Lavarias
(74) *Attorney, Agent, or Firm* — Onello & Mello, LLP

(57) ABSTRACT

A method includes providing a layer having a plurality of spaced-apart lines of a first material extending along a first direction and forming a line of a second material on opposing surfaces of each line of the first material, the first and second materials being different and adjacent lines of the second material being discontinuous. After forming the lines of the second material, forming pairs of spaced-apart lines of a third material between adjacent pairs of the lines of the second material, wherein each line of the third material is spaced apart from the closest line of the second material and the first and third materials are different.

17 Claims, 13 Drawing Sheets

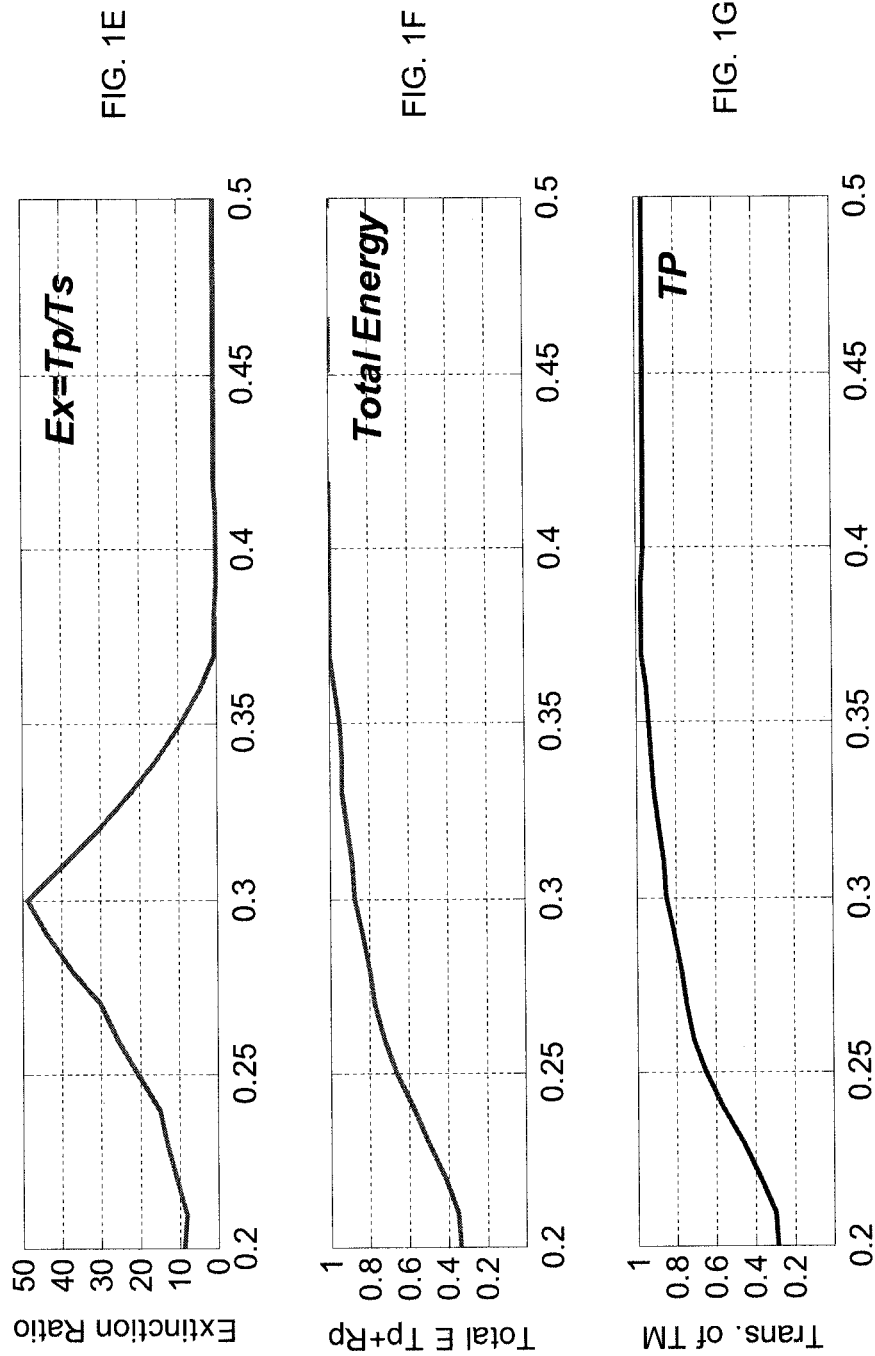

METHODS FOR FORMING OPTICAL FILMS

CROSS-REFERENCE TO RELATED APPLICATIONS

This application is a continuation of U.S. patent application Ser. No. 12/049,965, filed Mar. 17, 2008. The entire contents of that application are hereby incorporated by reference herein.

TECHNICAL FIELD

This disclosure relates to optical films and related articles, systems and methods.

BACKGROUND

Optical devices and optical systems are commonly used where manipulation of light is desired. Examples of optical devices include lenses, polarizers, optical filters, antireflection devices, retarders (e.g., quarter-waveplates), and beam splitters (e.g., polarizing and non-polarizing beam splitters). Optical devices can be in the form of a film.

SUMMARY

In general, in a first aspect, the inventive concept features a method, including providing a layer having a plurality of spaced-apart lines of a first material extending along a first direction and forming a line of a second material on opposing surfaces of each line of the first material, the first and second materials being different and adjacent lines of the second material being discontinuous. After forming the lines of the second material, forming pairs of spaced-apart lines of a third material between adjacent pairs of the lines of the second material, wherein each line of the third material is spaced apart from the closest line of the second material and the first and third materials are different.

Embodiments of the method can include one or more of the following features and/or features of other aspects. For example, the lines of the first material can have a pitch of 500 nm or less (e.g., 200 nm or less, 150 nm or less, 120 nm or less, 100 nm or less, 90 nm or less).

Forming the lines of the second material can include forming a continuous layer of the second material on the layer comprising the lines of the first material, and removing portions of the continuous layer of the second material to provide the lines of the second material. The continuous layer of the second material can be formed using atomic layer deposition. The continuous layer of the second material can conform to the surface profile of the layer comprising the plurality of lines of the first material. Removing the portions of the continuous layer of the second material can include etching the layer of the second material. The etching can include reactive ion etching.

In some embodiments, the second material is a dielectric material. The second material can be an oxide material. The second material can have a refractive index of 1.8 or more and an extinction coefficient of 1.8 or more for a wavelength $\lambda$ that is 400 nm or less.

The lines of the second material can have a line width of 100 nm or less (e.g., 75 nm or less, 50 nm or less, 40 nm or less, 30 nm or less, 20 nm or less, 10 nm or less). The lines of the second material can have a thickness of 50 nm or more (e.g., 75 nm or more, 100 nm or more, 125 nm or more, 150 nm or more, 175 nm or more, 200 nm or more). The lines of the second material can have an aspect ratio of 5:1 or more (e.g., 10:1 or more, 15:1 or more, 20:1 or more).

In some embodiments, forming the lines of the second material can include forming lines of a fourth material adjacent the lines of the second material, wherein the second and fourth materials are different and the adjacent lines of the second and fourth material form compound grating lines and the compound grating lines are spaced apart from the lines of the third material.

In certain embodiments, forming the lines of the third material includes forming a continuous layer of a fourth material over the lines of the second material and forming a layer of the third material over the layer of the fourth material, wherein the second and third materials are different from the fourth material. Forming the lines of the third material can further include removing portions of the continuous layer of the third material to provide the lines of the third material.

The third material can be a dielectric material. The third material can be an oxide material. The third material can be the same as or different from the second material.

The second material can have a refractive index of 1.8 or more and an extinction coefficient of 1.8 or more for a wavelength $\lambda$ that is 400 nm or less.

The lines of the third material can have a line width of 100 nm or less (e.g., 75 nm or less, 50 nm or less, 40 nm or less, 30 nm or less, 20 nm or less, 10 nm or less).

In some embodiments, the lines of the second material and the lines of the third material have the same line width. The lines of the third material can have a thickness that is different from a thickness of the lines of the second material. The thickness of the lines of the second material can be greater than the thickness of the lines of the third material.

In some embodiments, forming the lines of the third material can include forming lines of a fourth material adjacent the lines of the third material, wherein the third and fourth materials are different and the adjacent lines of the third and fourth material form compound grating lines and the compound grating lines are spaced apart from the lines of the second material.

In some embodiments, the method further includes depositing fifth material over the lines of the third material, wherein the first material and the third material are different. The first material can be the same as or different from the fifth material. The fifth material can be a dielectric material. The fifth material can be deposited using atomic layer deposition. Depositing the fifth material can fill spaces between adjacent lines of the third material. Depositing the fifth material can form a monolithic layer including the fifth material, the lines of the second material, and the lines of the third material.

Providing the layer having the lines of the first material can include providing a substrate supporting the lines of the first material, the substrate comprises a substrate material. The first material and substrate materials can be different. Alternatively, the first material and substrate materials can be the same. The substrate material can be a dielectric material.

Providing the layer having the lines of the first material can include providing a continuous layer of the first material and removing portions of the first material from the continuous layer to provide the lines of the first material.

The first material can be a dielectric material. The first material can be silica.

The lines of the second and third materials can form a grating that transmits 20% or more of light of wavelength $\lambda$ having a first polarization state incident on the layer along a path, transmits 2% or less of light of wavelength $\lambda$ having a second polarization state incident on the layer along the path, the first and second polarization states being orthogonal, and λ is 400 nm or less. In some embodiments, the grating transmits 50% or more (e.g., 60% or more, 70% or more, 80% or more) of light of wavelength λ having the first polarization state. The grating can transmit 1% or less (e.g., 0.5% or less, 0.2% or less, 0.1% or less) of light of wavelength λ having the second polarization state. The grating can have an extinction ratio of 20 dB or more (e.g., 25 dB or more, 30 dB or more) for light at λ transmitted by the grating. λ can be in a range from 100 nm to 400 nm. For example, λ is can be about 266 nm, about 248 nm, about 193 nm, or about 157 nm.

The pairs of spaced-apart lines of the third materials can be formed between alternating pairs of the lines of the second material. The lines of the first material can be positioned between pairs of lines of the second material between which no lines of the third material are formed.

In general, in another aspect, the invention features a method, including forming a first conformal layer of a first material over a first grating having a plurality of lines of the second material different from the first material, removing portions of the first conformal layer to provide a second grating having lines of the first material, forming a second conformal layer of a third material over the second gating, and removing portions of the second conformal layer to provide a third gating comprising lines of the third material and the lines of the first material. The third grating transmits 20% or more of light of wavelength λ having a first polarization state incident on the layer along a path, transmits 2% or less of light of wavelength λ having a second polarization state incident on the layer along the path, the first and second polarization states being orthogonal, and λ is 400 nm or less. Embodiments of the method can include one or more features of other aspects.

In general, in another aspect, the invention features an article, including a layer extending in a plane, the layer including a plurality of spaced-apart lines of a first material extending along a first direction in the plane, each of the lines of the first material having a thickness, $t_1$, along a second direction perpendicular to the plane, a plurality of spaced-apart lines of a second material extending along the first direction, each of the lines of the second material having a thickness, $t_2$, along the second direction, $t_2$ being less than $t_1$, and each line of the second material being spaced-apart from a closest line of the first material, wherein the first and second materials have a respective refractive index of 1.8 or more and a respective extinction coefficient of 1.8 or more for a wavelength λ that is 400 nm or less, and the layer transmits 20% or more of light of wavelength λ having a first polarization state incident on the layer perpendicular to the plane, transmits 2% or less of light of wavelength λ having a second polarization state incident on the layer along the path, the first and second polarization states being orthogonal. Embodiments of the article can include one or more features of other aspects. Embodiments of the article can be produced using the aforementioned methods.

In another aspect, the invention features a system, including a light source configured to provide radiation at a wavelength λ during operation of the system, a support apparatus configured to position a substrate to receive radiation provided by the light source, and a polarizer positioned between the light source and the target, the polarizer comprising the article of aforementioned aspect.

In general, in another aspect, the invention features an article, including a layer extending in a plane, the layer including a plurality of spaced-apart lines of a first material extending along a first direction in the plane, a plurality of spaced-apart lines of a second material extending along the first direction, each line of the second material being spaced-apart from a closest line of the first material, wherein the first and second materials are different and both have a respective refractive index of 1.8 or more and a respective extinction coefficient of 1.8 or more for a wavelength λ that is 400 nm or less, and the lines of the first material are arranged in pairs that alternate with pairs of the lines of the second material, adjacent pairs of the first material are separated by 200 nm or less and adjacent pairs of the second material are separated by 200 nm or less. Embodiments of the article can include one or more features of other aspects. Embodiments of the article can be produced using the aforementioned methods.

In another aspect, the invention features a system, including a light source configured to provide radiation at a wavelength λ during operation of the system, a support apparatus configured to position a substrate to receive radiation provided by the light source, and a polarizer positioned between the light source and the target, the polarizer comprising the article of aforementioned aspect.

In general, in a further aspect, the invention features an article, including a layer extending in a plane, the layer including a plurality of spaced-apart lines of a first material extending along a first direction in the plane, each of the lines of the first material having a thickness, $t_1$, along a second direction perpendicular to the plane, a plurality of spaced-apart lines of a second material extending along the first direction, each of the lines of the second material having a thickness, $t_2$, along the second direction, $t_2$ being less than $t_1$, and each line of the second material being spaced-apart from a closest line of the first material, wherein the lines of the first material are arranged in pairs that alternate with pairs of the lines of the second material, adjacent pairs of the first material are separated by 200 nm or less and adjacent pairs of the second material are separated by 200 nm or less, and the layer transmits 20% or more of light of wavelength λ having a first polarization state incident on the layer perpendicular to the plane, transmits 2% or less of light of a wavelength λ having a second polarization state incident on the layer along the path, the first and second polarization states being orthogonal and λ being 400 nm or less. Embodiments of the article can include one or more features of other aspects. Embodiments of the article can be produced using the aforementioned methods.

In another aspect, the invention features a system, including a light source configured to provide radiation at a wavelength λ during operation of the system, a support apparatus configured to position a substrate to receive radiation provided by the light source, and a polarizer positioned between the light source and the target, the polarizer comprising the article of aforementioned aspect.

Embodiments can include one or more of the following advantages.

For example, the methods can be used to form structures (e.g., periodic structures) of relatively small size (e.g., small periods). For example, periodic structures with effective periods less than about 100 nm (e.g., less than about 80 nm, less than about 60 nm, less than about 40 nm, less than 30 nm) can be formed. The structures do not significantly diffract optical radiation at wavelengths larger than the effective period of the structures. Thus, the structures formed using the methods disclosed herein can be used in optical devices and systems that manipulate short-wavelength optical radiation.

Effectively periodic structures with successively smaller effective periods can be formed by repeating the method steps. For example, multiple sacrificial layers can be provided in a starting multilayer article. Each sacrificial layer can be used to produce an effectively periodic structure with an effective period that is reduced by a factor of two relative to a periodic structure produced from a prior sacrificial layer. As a result, effectively periodic structures with relatively small effective periods can be produced starting from a periodic structure with a relatively large period.

The methods can be used to form effectively periodic structures without the use of a sacrificial layer. For example, photoresist layers exposed to form periodic pattern can provide a template for the deposition of conformal coating layers. The deposited conformal coating layers can then be selectively etched to produce an effectively periodic structure with an effective period reduced by a factor of two relative to the period of the pattern in the photoresist layers. Forming effectively periodic structures without use of a sacrificial layer reduces the number of method steps and reduces the amount of material used to form the effectively periodic structures.

Conformal layers can be deposited using processes that provide substantial control over the thickness of the conformal layer. For example, in some embodiments, conformal layers can be deposited monolayer by monolayer, allowing for thickness control on the order of one monolayer. For example, atomic layer deposition can be used to form conformal layers. Accurate control of the conformal layer thickness can allow for more accurate control over the fidelity of etch masks formed using methods disclosed herein.

The methods can be used to form structures from a variety of materials. Accordingly, the methods can be used to form a variety of different devices, such as different optical devices. As an example, materials, such as aluminum, that have relatively low transmission in certain regions of the electromagnetic spectrum, such as the deep ultraviolet region, can be used to form polarizers which operate in these regions of the spectrum. As another example, materials, such as dielectric materials, that have relatively high transmission in certain regions of the electromagnetic spectrum, such as the deep ultraviolet region, can be used to form retarders which operate in these regions of the spectrum.

In certain aspects, grating layers formed from materials with a refractive index and extinction coefficient of 1.5 or more at a wavelength $\lambda$ can be used as a polarizer for radiation at $\lambda$. It is believed that absorption at $\lambda$ (e.g., in the UV) by the material forming the gratings generates the polarization effect. This aspect can differ from a conventional wire-grid polarizer which typically utilizes materials with high reflectivity at the operating wavelength.

Certain materials with refractive indexes and extinction coefficients of 1.5 or more (e.g., $TiO_2$ and W) can be deposited using atomic layer deposition. This deposition method can be used to form gratings with short effective periods, narrow line widths, and high aspect ratios, suitable for polarizing radiation in the UV portion of the electromagnetic (EM) spectrum.

Because of the absorption principle, it is believed that the width of the portions forming the polarizing structure should be very thin in order to avoid excessive absorption of the pass state light. For example, for certain embodiments configured to polarize UV radiation, the gratings may have an effective period of about 150 nm or less (e.g., about 100 nm or less), while the portions forming the grating may have a width of about 10 nm to 15 nm to provide sufficient pass state transmission, whereas for widths of 30 nm to 40 nm or more, the pass state transmission can be unacceptably low for certain target applications.

Among other advantages, embodiments disclosed herein can include polarizer films for use in the UV portion of the EM spectrum. Embodiments include polarizer films that feature gratings formed from materials that absorb radiation at the operating wavelength(s).

The polarizer films can exhibit good resistance to environmental degradation. For example, compared to polarizers formed from materials which can oxidize over time thereby degrading performance, embodiments can include polarizer films formed from materials which don't oxidize in the same way, for example, the metal grid lines do in certain wire grid polarizers. The environmental resistance can be especially pronounced for polarizer gratings in which the material used to form the grating has a high surface to volume ratio, for example, gratings having very narrow line widths (e.g., line widths of about 50 nm or less) and/or high aspect ratios.

Good resistance to environmental degradation can be achieved using monolithic grating layers. A cap layer can also be provided to encapsulate the grating layer, reducing any exposure of the grating layer to environmental elements. In some embodiments, monolithic grating layers having relatively high extinction ratios and/or relatively high pass state transmission can be provided. For example, polarizer films are provided that are formed by depositing more than two grating lines on each line of a larger period sacrificial grating structure. This can allow formation of high aspect ratio gratings having extremely short effective grating periods. Such structures can exhibit improved optical performance (e.g., higher extinction ratios and/or higher pass state transmission) relative to monolithic grating layers formed by depositing only two grating lines per each line of the sacrificial grating structure.

Embodiments include broadband polarizers operational in the UV and visible portions of the spectrum. For example, in some embodiments, gratings are formed from materials that absorb and/or reflect radiation across a broad spectrum, including portions of the UV and visible portions of the spectrum. For example, gratings formed from Tungsten can be used for polarization of UV and visible wavelengths. In certain embodiments, polarizers can include gratings formed from two or more different materials, where one material is selected to provide polarization in one region of the EM spectrum, while another material is selected to provide polarization in a different region of the EM spectrum. For example, polarizers can include a grating formed from $TiO_2$ and a grating formed from a metal, such as aluminum. The $TiO_2$ grating provides polarization in the 200 nm to 310 nm range, and the aluminum grating provides polarization in the visible.

In certain embodiments, polarizer films can be configured to polarize radiation in the infrared (IR) region of the EM spectrum (e.g., in a range from about 1,200 nm to about 2,000 nm).

Other features and advantages of the invention will be apparent from the description, drawings, and claims.

DESCRIPTION OF DRAWINGS

FIG. 1E is a plot of simulated extinction ratio as a function of wavelength for an embodiment of a linear polarizer film.

FIG. 1F is a plot of simulated total pass state transmission and reflection as a function of wavelength for an embodiment of a linear polarizer film.

FIG. 1G is a plot of simulated pass state transmission as a function of wavelength for an embodiment of a linear polarizer film.

Like reference symbols in the various drawings indicate like elements.

DETAILED DESCRIPTION

Figure 1A:
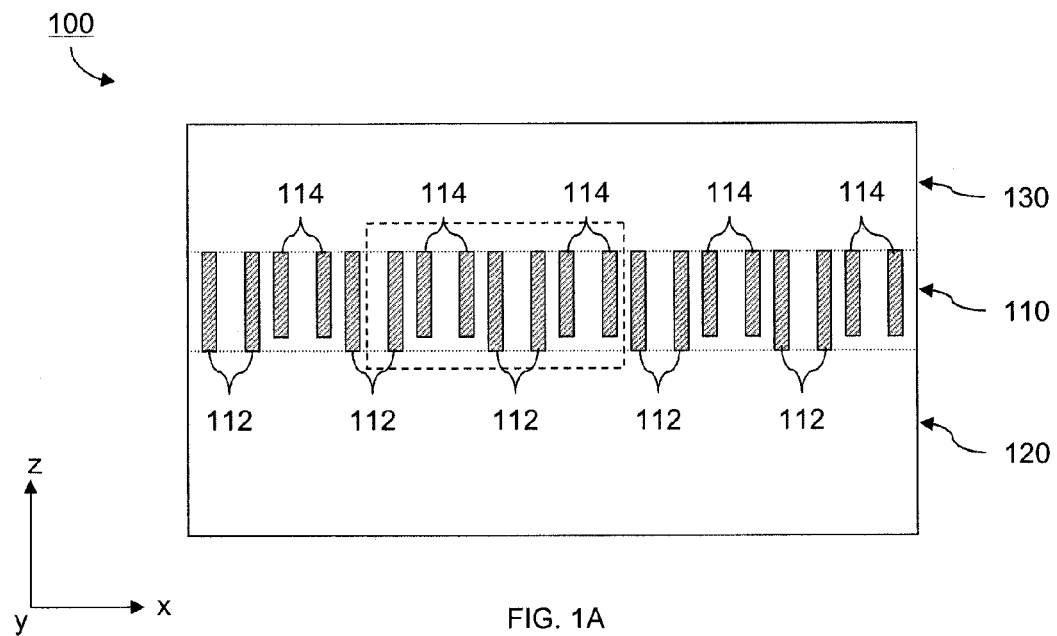
FIG. 1A is a cross-sectional view of an embodiment of a polarizer film.
Figure 1B:
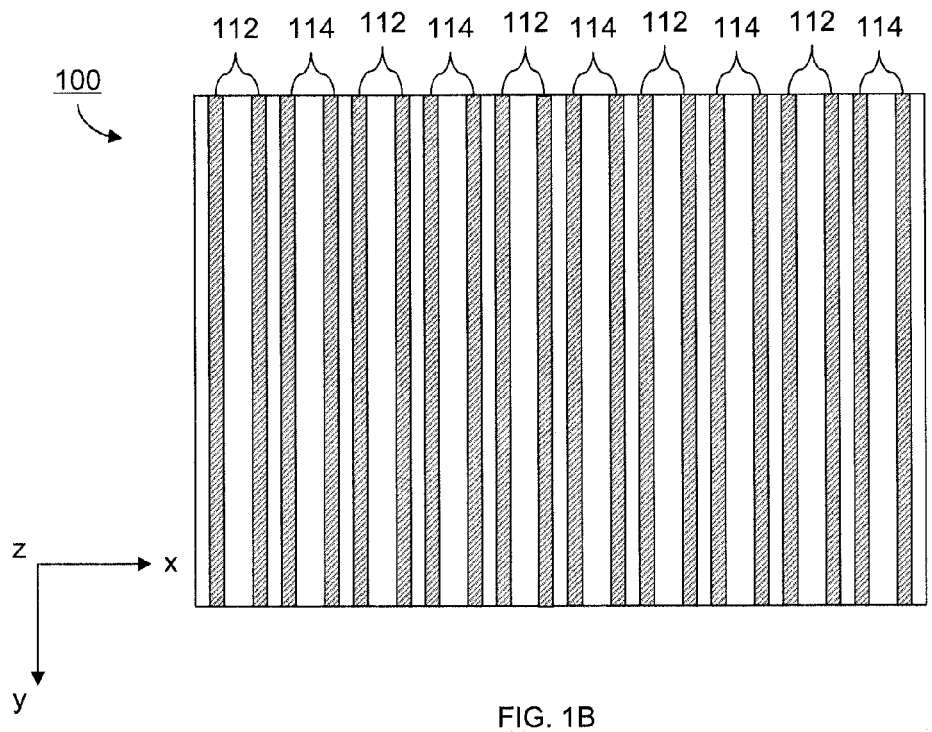
FIG. 1B is a plan view of an embodiment of a polarizer film.
Figure 1C:
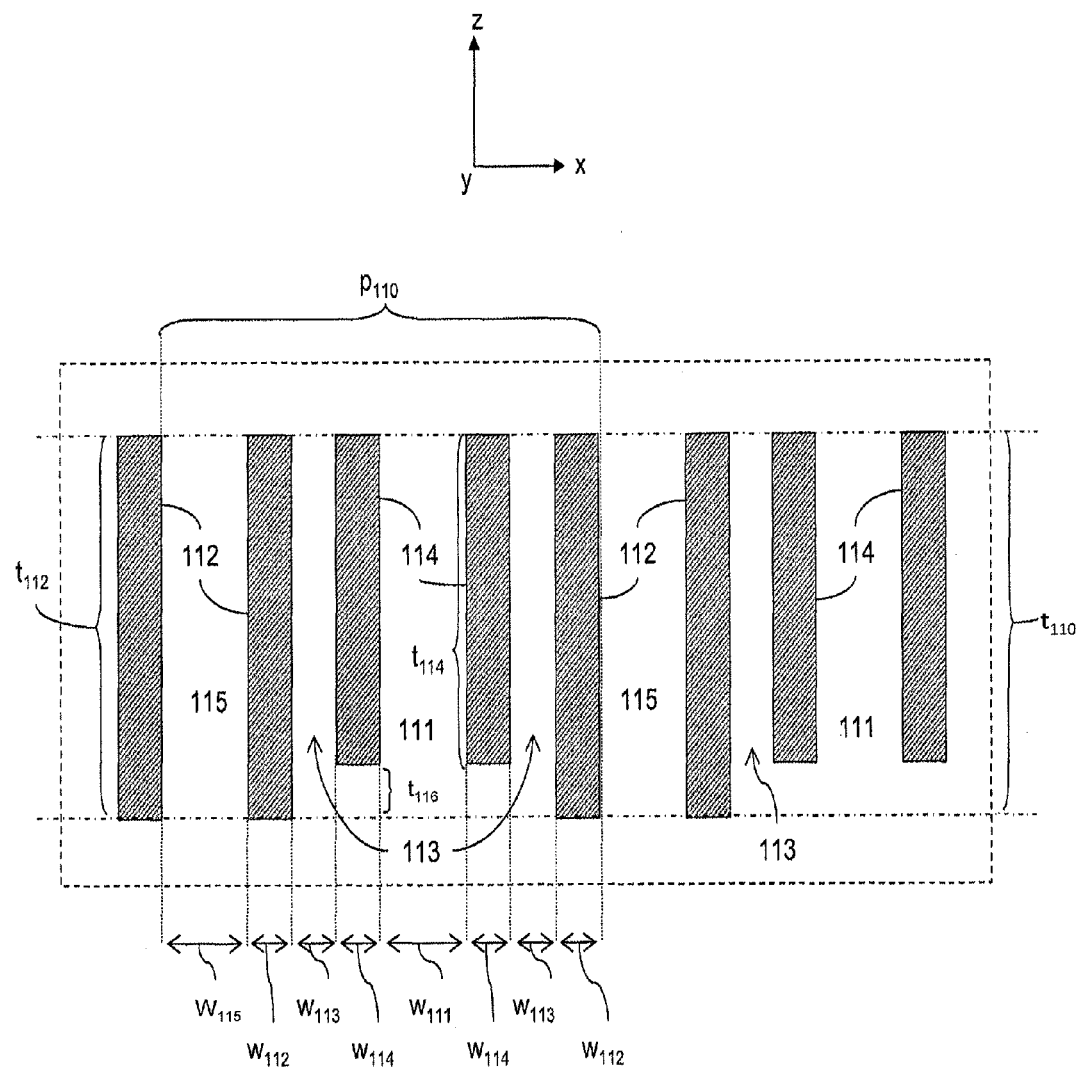
FIG. 1C is a cross-sectional view of the polarizer film shown in FIG. 1A.

Referring to FIGS. 1A-1C, a linear polarizer film 100 includes a grating layer 110, a substrate layer 120, and a cap layer 130. A Cartesian co-ordinate system is shown for reference. Grating layer 110 linearly polarizes incident light of wavelength $\lambda_1$ propagating parallel to the z-axis. In other words, for light of wavelength $\lambda_1$ incident on linear polarizer film 100 propagating parallel to the z-axis, linear polarizer film 100 transmits a relatively large amount of the component of incident light plane-polarized in the x-direction (referred to as "pass" state polarization) compared to the amount of the component plane-polarized in the y-direction (referred to as "block" state polarization). For example, polarizer film 100 can transmit about 25% or more (e.g., about 30% or more, about 40% or more, about 50% or more, about 60% or more, about 80% or more) of pass state light at $\lambda_1$ while passing about 5% or less of the block state light (e.g., about 4% or less, about 3% or less, about 2% or less, about 1% or less, about 0.5% or less, 0.3% or less, 0.2% or less, 0.1% or less) at $\lambda_1$. In some embodiments, transmission of pass state radiation can be less than 25% at $\lambda_1$ (e.g., about 10%, about 15%, about 20%), while still being significantly more than the block state transmission. $\lambda_1$ can correspond to a local (or global) maximum in the pass state transmission spectrum. Alternatively, or additionally, $\lambda_1$ can correspond to a local (or global) minimum in the block state transmission spectrum.

In general, $\lambda_1$ is between about 100 nm and about 5,000 nm. In certain embodiments, $\lambda_1$ corresponds to a wavelength within the visible portion of the EM spectrum (e.g., from 400 nm to 700 nm). In some embodiments, $\lambda_1$ corresponds to a wavelength in the UV portion of the EM spectrum (e.g., from about 100 nm to about 400 nm, from about 150 nm to about 350 nm, from about 200 nm to about 300 nm, about 250 nm, 266 nm).

In some embodiments, linear polarizer film 100 polarizes radiation at more than one wavelength. For example, linear polarizer film 100 can polarize radiation at wavelengths $\lambda_1$ and $\lambda_2$, where $\lambda_1 < \lambda_2$ and $|\lambda_1 - \lambda_2|$ is about 50 nm or more (e.g., about 75 nm or more, about 100 nm or more, about 150 nm, about 200 nm or more, about 250 nm or more, about 300 nm or more, about 400 nm or more, about 500 nm or more). $\lambda_2$ can correspond to a local (or global) maximum in the pass state transmission spectrum. Alternatively, or additionally, $\lambda_2$ can correspond to a local (or global) minimum in the block state transmission spectrum.

In certain embodiments, linear polarizer film 100 can polarize radiation for a continuous band of wavelengths, $\Delta\lambda$, that includes $\lambda_1$ and $\lambda_2$. For example, linear polarizer film 100 can polarize radiation for a band of wavelengths, $\Delta\lambda$, about 10 nm wide or more (e.g., about 20 nm wide or more, about 50 nm wide or more, about 80 nm wide or more, about 100 nm or more, about 200 nm or more, about 300 nm or more, about 400 nm or more). In some embodiments, linear polarizer film 100 can polarize a band of wavelengths in the UV portion of the EM spectrum. For example, linear polarizer film 100 can polarize radiation from 200 nm to 300 nm. In certain embodiments, linear polarizer film 100 polarizes radiation at 266 nm, at 248 nm, at 193 nm, and/or at 157 nm.

Furthermore, while linear polarizer film 100 polarizes incident radiation propagating parallel to the z-axis, in some embodiments, polarizer film 100 can polarize radiation at $\lambda_1$ for radiation at non-normal angles of incidence (i.e., for radiation incident on linear polarizer film 100 propagating at an angle $\theta$ with respect to the z-axis, where $\theta$ is non-zero). In certain embodiments, linear polarizer film 100 can polarize radiation incident at more than one angle of incidence, such as for a range of incident angles. For example, in some embodiments, linear polarizer film 100 polarizes radiation incident within a cone of incident angles for $\theta$ of about 10° or more (e.g., about 15° or more, about 20° or more, about 30° or more, about 45° or more). Note that for non-normal incidence, the pass state corresponds to light polarized parallel to the x-z plane, while the block state corresponds to light polarized orthogonal to the x-z plane.

In embodiments, linear polarizer film 100 blocks a relatively large amount of incident radiation at $\lambda_1$ and/or $\lambda_2$ having the block state polarization by absorbing a relatively large amount of the block state radiation. For example, linear polarizer film 100 can absorb about 80% or more of incident radiation at $\lambda_1$ and/or $\lambda_2$ having the block polarization state (e.g., about 90% or more, about 95% or more, about 98% or more, about 99% or more). In some embodiments, block state reflection from polarizer film 100 is relatively low. For example, polarizer film 100 can reflect about 50% or less (e.g., about 20% or less, about 15% or less, about 10% or less, about 5% or less) of incident block state radiation at $\lambda_1$. In certain embodiments, polarizer film 100 can reflect about 50% or less (e.g., about 20% or less, about 15% or less, about 10% or less, about 5% or less) of incident block state radiation at $\lambda_1$ and $\lambda_2$. Alternatively, in some embodiments, polarizer film 100 can reflect about 50% or less (e.g., about 20% or less, about 15% or less, about 10% or less, about 5% or less) of incident block state radiation at while reflecting about 50% or more (e.g., about 60% or more, about 70% or more, about 80% or more, about 90% or more) of incident block state radiation at $\lambda_2$.

Linear polarizer film 100 can have a relatively high extinction ratio, $E_T$, for transmitted light at $\lambda_1$ and/or $\lambda_2$. For transmitted light, the extinction ratio refers to the ratio of pass state intensity at $\lambda_1$ and/or $\lambda_2$ to the block state intensity transmitted by linear polarizer film 100. Extinction ratio is also referred to as polarizer contrast. $E_T$ can be, for example, about 10 or more at $\lambda_1$ and/or $\lambda_2$ (e.g., about 20 or more, about 30 or more, about 40 or more, about 50 or more, about 60 or more, about 70 or more, about 80 or more, about 90 or more, about 100 or more, about 150 or more, about 300 or more, about 500 or more). In some embodiments, $\lambda_1$ corresponds to a local (or global) maximum in the extinction ratio as a function of wavelength, $E_T(\lambda)$. Alternatively, or additionally, $\lambda_2$ can correspond to a local (or global) maximum in $E_T(\lambda)$.

The extinction ratio of a polarizer can also be expressed in decibels (dB) rather than as a ratio, where the relationship between the ratio $E_T$ and its corresponding dB value can be determined according to the equation:

$$E_{T,dB} = 10 \cdot \log_{10} E_T.$$

For example, an extinction ratio of 30 corresponds to approximately 15 dB, an extinction ratio of 50 corresponds to approximately 17 dB, and an extinction ratio of 100 corresponds to 20 dB.

Linear polarizer film 100 can exhibit good resistance to degradation, e.g., due to exposure to environmental or operational factors. Such factors include, for example, humidity, heat, exposure to an oxidant (e.g., air), and/or radiation. In general, good resistance to degradation means that the optical performance (e.g., pass state transmission, block state transmission, extinction ratio) of linear polarizer film varies relatively little with prolonged exposure to one or more of the environmental or operational factors. For example, in embodiments where linear polarizer film 100 is used as a polarizer for UV radiation, the polarizer film can exhibit little variation in optical performance over substantial periods (e.g., 100 hours or more, 500 hours or more, 1,000 hours or more) of exposure to the radiation.

One way to characterize a linear polarizer's resistance to environmental degradation is by controlled environmental testing, such as exposure to an elevated temperature in a controlled atmosphere. As an example, a linear polarizer can subject to the test conditions and measurement criteria summarized in Table I. These Test conditions are in accordance with section 6.2 of Telcordia GR-1221-CORE and in sections 4.1 and 4.2 of Telcordia GR-1209-CORE, as referenced in Table I.

Turning now to the structure and composition of linear polarizer 100, grating layer 110 includes grating lines 112 and 114 that are separated from one another along the x-direction and that extend along the y-direction. Grating lines 112 and 114 are arranged in pairs. In other words, each pair of adjacent grating lines 112 are separated by a pair of grating lines 114, and vice-versa. As shown in FIG. 1C, adjacent grating lines 112 are separated by portions 115, adjacent grating lines 114 are separated by portions 111, and adjacent grating lines 112 and 114 are separated by portions 113. Grating layer 110 is a monolithic layer. In other words, there are no gaps between the different portions and grating lines of the layer.

Each grating line and portion in grating layer 110 has a width measured along the x-direction. As shown in FIG. 1C, grating lines 112 have a width $w_{112}$ and grating lines 114 have a width $w_{114}$. In general, $w_{112}$ and $w_{114}$ can be the same or different.

In general, $w_{112}$ and/or $w_{114}$ are less than $\lambda_1$. For example, $w_{112}$ and/or $w_{114}$ can be about $0.2\lambda_1$ or less (e.g., about $0.1\lambda_1$ or less, about $0.05\lambda_1$ or less, about $0.04\lambda_1$ or less, about $0.03\lambda_1$ or less, about $0.02\lambda_1$ or less, $0.01\lambda_1$ or less). For example, in some embodiments, $w_{112}$ and/or $w_{114}$ is/are about 200 nm or less (e.g., about 150 nm or less, about 100 nm or less, about 80 nm or less, about 70 nm or less, about 60 nm or less, about 50 nm or less, about 40 nm or less, about 30 nm or less). In some embodiments, $w_{112}$ and/or $w_{114}$ is/are about 5 nm or more (e.g., 7 nm or more, 8 nm or more, 10 nm or more, 15 nm or more, about 20 nm or more).

Portions 111 have a width $w_{111}$, portions 113 have a width $w_{113}$, and portions 115 have a width $w_{115}$. In general, widths $w_{111}$, $w_{113}$, and $w_{115}$ can be the same or different.

TABLE I

| Test Description | Standard | Reference | Conditions | Measurement after: |
|---|---|---|---|---|
| High Temperature Storage (Dry Heat) | EIA/TIA-455-4A | 6.2.4 | 85 ± 2° C. <40% RH | 2000 hours (5000 hours for info) |
| High Temperature Storage (Damp Heat) | EIA/TIA-455-5A | 6.2.5 | 85 ± 2° C. 85 ± 5% RH | 2000 hours |
| Low Temperature Storage | EIA/TIA-455-4A | 6.2.6 | −40 ± 5° C. | 2000 hours |
| Temperature Cycling | EIA/TIA-455-3A | 6.2.7 | −40 to + 85° C. | 500 cycles (1000 cycles for info) |
| Thermal Shock | JESD22-A106-A, cond B | 6.2.3 | 0 to 100° C. | 15 cycles |

Linear polarizer films with good resistance to degradation exhibit a variation (e.g., increase or decrease) in transmittance at $\lambda_1$ of about 8% or less (e.g., 5% or less, 4% or less, 3% or less, 2% or less, 1% or less) as measured before and after the exposure. Linear polarizer films with good resistance to degradation can also exhibit a variation (e.g., increase or decrease) in $E_T$ at $\lambda_1$ of about 8% or less (e.g., 5% or less, 4% or less, 3% or less, 2% or less, 1% or less) as measured before and after the exposure.

As a further example, another way to test environmental stability is by prolonged exposure to a high power UV emission source for extended periods. Specifically, a linear polarizer film can be tested by positioning the polarizer 2 cm from a 1,000 W Mercury Arc Lamp (e.g., Model Code UVH 1022-0 available from Ushio America, Cypress, Calif.). The polarizer film is oriented so that light from the source is incident on the polarizer along z-axis. $E_T$ is measured at $\lambda_1$ before and after exposure. Embodiments of linear polarizer films with good resistance to degradation can also exhibit a variation (e.g., increase or decrease) in $E_T$ at $\lambda_1$ of about 8% or less (e.g., 5% or less, 4% or less, 3% or less, 2% or less, 1% or less) as measured before and after the exposure.

$w_{111}$, $w_{113}$, and/or $w_{115}$ can be about $0.2\lambda_1$ or less (e.g., about $0.1\lambda_1$ or less, about $0.05\lambda_1$ or less, about $0.04\lambda_1$ or less, about $0.03\lambda_1$ or less, about $0.02\lambda_1$ or less, $0.01\lambda_1$ or less). For example, in some embodiments, $w_{111}$, $w_{113}$, and/or $w_{115}$ is/are about 200 nm or less (e.g., about 150 nm or less, about 100 nm or less, about 80 nm or less, about 70 nm or less, about 60 nm or less, about 50 nm or less, about 40 nm or less, about 30 nm or less). In certain embodiments, $w_{111}$, $w_{113}$, and/or $w_{115}$ is/are about 5 nm or more (e.g., 7 nm or more, 8 nm or more, 10 nm or more, 15 nm or more, about 20 nm or more).

In some embodiments, $w_{113}$ can be approximately the same as $w_{112}$ and/or $w_{114}$. For example, in some embodiments, two or more of $w_{112}$, $w_{113}$, and $w_{114}$ are in a range from 5 nm to 15 nm.

Portions 111, 113, and 115 and grating lines 112 and 114 form a repeating structure having a pitch $p_{110}$, as shown in FIG. 1C. $p_{110}$ equals $w_{111}+2w_{112}+2w_{113}+2w_{114}+w_{115}$. Grating lines 112 and 114 repeat with an effective period, $\Lambda$, equal to $p_{110}/4$. In some embodiments, where $w_{111}=w_{113}=w_{115}$ and $w_{112}=w_{114}$, grating lines 112 and 114 form a periodic structure where the effective period is an actual period of the grating lines.

In general, effective grating period, $\Lambda$, is smaller than $\lambda_1$ and as a result light of wavelength $\lambda_1$ interacts with grating layer 110 without encountering significant high-order, far-field diffraction that can occur when light interacts with periodic structures. Where $\lambda_1$ is in the visible or UV portion of the EM spectrum, grating layer 110 can be considered an example of a nanostructured layer.

In general, $\Lambda$ is less than $\lambda_1$, such as about $0.5\lambda_1$ or less (e.g., about $0.3\lambda_1$ or less, about $0.2\lambda_1$ or less, about $0.1\lambda_1$ or less, about $0.08\lambda_1$ or less, about $0.05\lambda_1$ or less, about $0.04\lambda_1$ or less, about $0.03\lambda_1$ or less, about $0.02\lambda_1$ or less, $0.01\lambda_1$ or less). In some embodiments, $\Lambda$ is about 500 nm or less (e.g., about 300 nm or less, about 200 nm or less, about 150 nm or less, about 130 nm or less, about 100 nm or less, about 80 nm or less, about 60 nm or less, about 50 nm or less, about 40 nm or less).

The duty cycle of grating layer 110, given by the ratio $(2w_{112}+2w_{114})/p_{110}$, can vary as desired. In some embodiments, the duty cycle is less than about 50% (e.g., about 40% or less, about 30% or less, about 20% or less, about 10% or less, about 8% or less). Alternatively, in certain embodiments, the duty cycle is more than about 50% (e.g., about 60% or more, about 70% or more, about 80% or more).

Grating layer 110 has a thickness $t_{110}$, measured along the z-direction. In general, the thickness, $t_{110}$, of grating layer 110 measured along the z-axis can vary as desired. In general, the thickness of layer 110 is selected based on the desired optical properties of grating layer 110 at $\lambda_1$ and constraints on the manufacturability of such structures. In some embodiments, $t_{110}$ can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

Grating lines 112 have a thickness $t_{112}$ and grating lines 114 have a thickness $t_{114}$, both measured along the z-direction. $t_{112}$ is the same as $t_{110}$. $t_{114}$ is less than $t_{112}$ and $t_{110}$ by an amount $t_{116}$. For example, in some embodiments, $t114$ is 98% or less of $t112$ (e.g., 95% or less, 90% or less, 85% or less). In general, $t_{116}$ can be 5 nm or more (e.g., 7 nm or more, 10 nm or more, 12 nm or more, 15 nm or more, 20 nm or more). In certain embodiments, $t_{116}$ is equal to $w_{113}$.

In general, the dimensions (e.g., thicknesses and widths) of the grating lines and portions separating the grating lines, and the materials from which they are formed are selected based on the desired optical properties of linear polarizer 100.

In general, the number of grating lines 112 and 114 in a grating layer may vary as desired. The number of portions depends on the effective period, $\Lambda$, and the area required by the linear polarizer's end use application. In some embodiments, grating layer 110 can have about 50 or more portions (e.g., about 100 or more portions, about 500 or more portions, about 1,000 or more portions, about 5,000 or more portions, about 10,000 or more portions, about 50,000 or more portions, about 100,000 or more portions, about 500,000 more portions).

The aspect ratio of grating layer thickness, $t_{110}$, to $w_{112}$ and/or $t_{110}$ to $w_{114}$ can be relatively high. For example $t_{110}$:$w_{112}$ and/or $t_{110}$:$w_{114}$ can be about 2:1 or more (e.g., about 3:1 or more, about 4:1 or more, about 5:1 or more, about 8:1 or more, about 10:1 or more, about 12:1 or more, about 15:1 or more).

Turning to the composition of grating layer 110, in general, the composition of grating lines 112 and 114, and portions 111, 113, and 115 are selected so that linear polarizer film 100 has desired polarizing properties. The composition of grating lines 112 and 114 and portions 111, 113, and 115 are also selected based factors such as their compatibility with the manufacturing processes used in production of polarizer film 100 and their environmental properties, such as resistance to degradation due to environmental exposure.

In general, grating lines 112 and grating lines 114 can be formed from the same materials or from different materials. In embodiments, grating lines 112 and 114 are formed from materials that have relatively low transmissivity at $\lambda_1$. A one micrometer thick bulk sample of a material having relatively low transmissivity at $\lambda_1$ transmits less than about 0.1% or less of radiation at $\lambda_1$ normally incident thereon (e.g., about 0.05% or less, about 0.01% or less, about 0.001% or less, about 0.0001% or less). Low transmissivity materials include materials that absorb a relatively large amount of radiation at $\lambda_1$.

In some embodiments, for example, where $\lambda_1$ is in the UV portion of the EM spectrum, grating lines 112 and/or 114 can be formed from titanium dioxide ($TiO_2$), tungsten (W), indium tin oxide (ITO), tantalum oxide ($Ta_2O_5$) molybdenum (Mo), indium phosphide (InP), gallium arsenide (GaAs), aluminum gallium arsenide ($Al_xGa_{1-x}As$), silicon (Si) (e.g., crystalline, semi-crystalline, or amorphous silicon), indium gallium arsenide (InGaAs), germanium (Ge), or gallium phosphide (GaP).

More generally, grating lines 112 and 114 can include inorganic and/or organic materials. Examples of inorganic materials include metals, inorganic semiconductors, and inorganic dielectric materials (e.g., glass). Examples of organic materials include polymers.

Grating lines 112 and/or 114 can be formed from materials that have relatively high absorption at $\lambda_1$. A one micrometer thick bulk sample of a material having a relatively high absorption absorbs about 90% or more (e.g., about 93% or more, about 95% or more) of radiation at $\lambda_1$ normally incident thereon. In general, depending on $\lambda_1$, materials that have a relatively high absorption can include dielectric materials, semiconductor materials, and electrically-conducting materials. Dielectric materials that have a relatively high absorption for certain wavelengths in the UV, for example, include $TiO_2$. An example of a semiconductor material that has relatively high absorption for certain wavelengths in the UV is silicon (Si). Further examples of semiconductor materials include Ge, indium phosphide (InP), and silicon-germanium (SiGe). Examples of electrically-conducting materials that have a relatively high absorption for certain wavelengths in the UV and visible include cobalt (Co), platinum (Pt), and titanium (Ti). Other materials include chromium (Cr), nickel (Ni), vanadium (V), tantalum (Ta), palladium (Pd), and iridium (Ir). Metal silicides, such as tungsten silicide ($WSi_2$), titanium silicide (TiSi), tantalum silicide (TaSi), hafnium silicide ($HfSi_2$), niobium silicide (NbSi), and chromium silicide (CrSi)) can also be used.

In some embodiments, grating lines 112 and/or 114 are formed from a material that have relatively low transmissivity at $\lambda_2$, such as a material that has a relatively low transmissivity across a band of wavelengths including $\lambda_1$ and $\lambda_2$. For example, W has relatively low transmissivity over the wavelength range from about 200 nm to about 600 nm and can be used to form a linear polarizer film that can be used over a relatively large range of wavelengths that include portions of the UV spectrum. In certain embodiments, the material forming grating lines 112 and/or 114 has a relatively high absorption at $\lambda_2$.

In general, materials can be characterized by a complex index of refraction, $\tilde{n}=n-ik$, where n is the refractive index and k is the extinction coefficient. $\tilde{n}$, in general, varies as a function of wavelength. Grating lines 112 and/or 114 can be formed from a material that has an extinction coefficient, k, of 1.5 or more (e.g., 1.8 or more, 2 or more, 2.1 or more, 2.2 or more, 2.3 or more, 2.4 or more, 2.5 or more, 2.6 or more, 2.7 or more, 2.8 or more, 2.9 or more, 3 or more, 4 or more) at $\lambda_1$. In embodiments, k can be 5 or less (e.g., 4 or less, 3.5 or less). In certain embodiments, k is in a range from 2 to 5. For example, W has a k value of 2.92 at about 633 nm. Additionally, in some embodiments, the material can have a refractive index, n, of 1.5 or more (e.g., 1.8 or more, 2 or more, 2.1 or more, 2.2 or more, 2.3 or more, 2.4 or more, 2.5 or more, 2.6 or more, 2.7 or more, 2.8 or more, 2.9 or more, 3 or more) at $\lambda_1$. As an example, W has a n value of 3.65 at about 633 nm. As another example, $TiO_2$ has an n value of 2.88 at about 633 nm.

In certain embodiments, grating lines 112 and/or 114 are formed from a material that has an extinction coefficient, k, of 1.5 or more (e.g., 1.8 or more, 2 or more, 2.1 or more, 2.2 or more, 2.3 or more, 2.4 or more, 2.5 or more, 2.6 or more, 2.7 or more, 2.8 or more, 2.9 or more, 3 or more) at $\lambda_2$ as well as $\lambda_1$. The material can have a refractive index, n, of 1.5 or more (e.g., 1.8 or more, 2 or more, 2.1 or more, 2.2 or more, 2.3 or more, 2.4 or more, 2.5 or more, 2.6 or more, 2.7 or more, 2.8 or more, 2.9 or more, 3 or more) at $\lambda_2$.

Figure 1D:
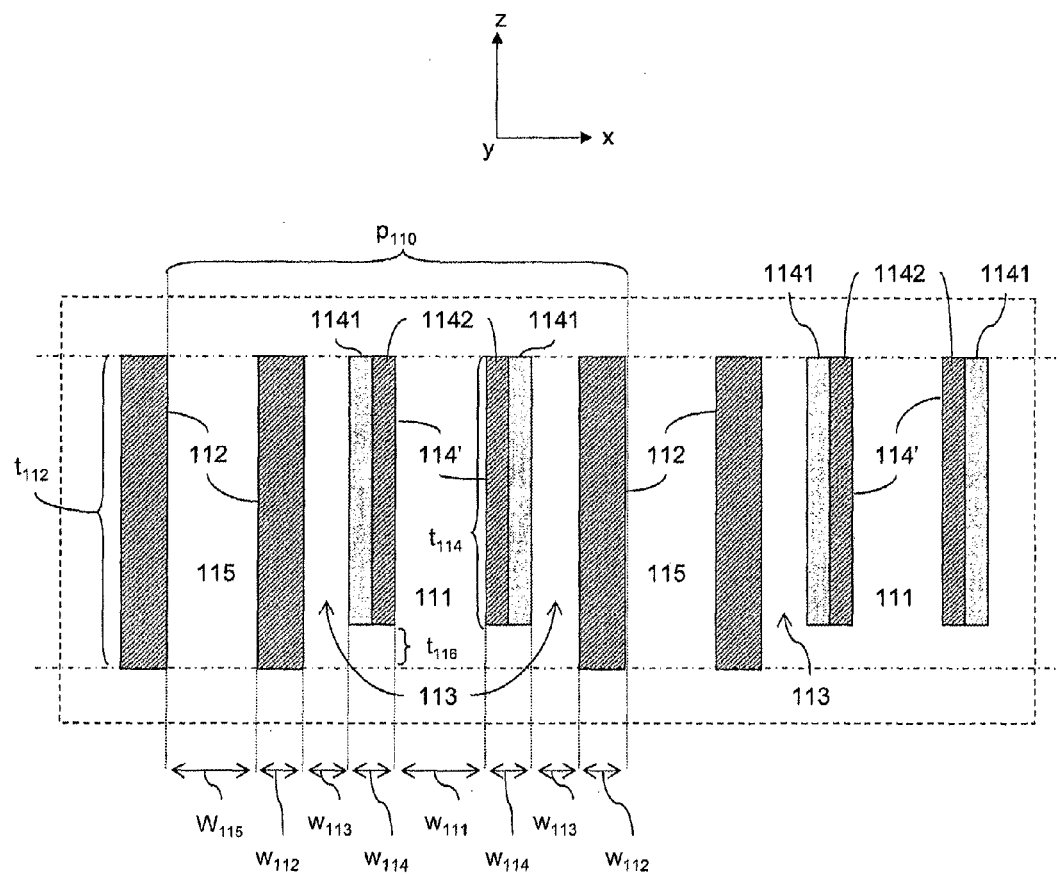
FIG. 1D is a cross-sectional view of an embodiment of a polarizer film.

In general, grating lines 112 and/or 114 include a single material. However, in certain embodiments, grating lines 112 and/or 114 can be compound grating lines, including layers of more than one material. For example, referring to FIG. 1D, in some embodiments, grating lines 114' are formed from layers of two different materials, indicated as 1141 and 1142, respectively. The width (i.e., dimension in the x-direction) of layers 1141 and 1142 can be the same or different. Compound grating lines can be formed from layers of more than two materials.

As another example of compound grating lines, grating lines 112 and/or 114 can be formed from a nanolaminate, which refers to a composition that is composed of layers of at least two different materials and the layers of at least one of the materials are extremely thin (e.g., between one and about 10 monolayers thick). Optically (e.g., at $\lambda_1$), nanolaminate materials have a locally homogeneous index of refraction that depends on the refractive index of its constituent materials. Varying the amount of each constituent material can vary the refractive index of a nanolaminate. Examples of nanolaminate portions include portions composed of silica ($SiO_2$) monolayers and $TiO_2$ monolayers, $SiO_2$ monolayers and tantalum pentoxide ($Ta_2O_5$) monolayers, or aluminum oxide ($Al_2O_3$) monolayers and $TiO_2$ monolayers.

In general, grating lines 112 and/or 114 can include crystalline, semi-crystalline, and/or amorphous materials.

Turning now to the composition of portions 111, 113, and 115, in general, these portions can be formed from the same material or different portions can be formed from different materials. Generally, portions 111, 113, and/or 115 are formed from a material or materials that has a significantly higher transmissivity at $\lambda_1$ than the material(s) forming grating lines 112 and 114. For example, the transmissivity of the material forming portions 111, 113, and/or 115 can be about 100 times or more (e.g., about 500 times or more, about $10^3$ times or more, about $5 \times 10^3$ times or more, about $10^4$ times or more) higher than the transmissivity of the material forming grating lines 112 and 114. In some embodiments, portions 111, 113, and/or 115 are formed from $SiO_2$ (e.g., quartz), which is an example of a material that has relatively high transmissivity at visible wavelengths. Portions 111, 113, and/or 115 can be formed from an inorganic glass (e.g., a borosilicate glass) that has the desired properties at $\lambda_1$.

In certain embodiments, portions 111, 113, and/or 115 are formed from a material that has a relatively low transmissivity at $\lambda_2$. For example, portions 111, 113, and/or 115 can be formed from materials that have relatively high absorption or reflectivity at $\lambda_2$.

The material forming portions 111, 113, and/or 115 can be selected so that grating layer 110 linearly polarizes radiation at $\lambda_2$, while grating lines 112 and 114 are formed from a material selected so that grating layer 110 linearly polarizes radiation at $\lambda_1$. As an example, in some embodiments grating lines 112 and 114 are formed from an oxide material (e.g., $TiO_2$) that has relatively high absorption in the UV (e.g., at approximately 250 nm) while portions 111, 113, and/or 115 are formed from a metal (e.g., Al) that has relatively high reflectivity or absorption in the visible (e.g., about 450 nm to about 700 nm) and/or IR (e.g., from 700 nm to about 2,000 nm).

In certain embodiments, portions 111, 113, and/or 115 are formed from a material that has an extinction coefficient, k, of 2 or more (e.g., 2.1 or more, 2.2 or more, 2.3 or more, 2.4 or more, 2.5 or more, 2.6 or more, 2.7 or more, 2.8 or more, 2.9 or more, 3 or more) at $\lambda_2$. Additionally, in some embodiments, the material can have a refractive index, n, of 2 or more (e.g., 2.1 or more, 2.2 or more, 2.3 or more, 2.4 or more, 2.5 or more, 2.6 or more, 2.7 or more, 2.8 or more, 2.9 or more, 3 or more) at $\lambda_2$.

In general, the structure and composition of grating layer 110 is selected based on the desired optical performance of linear polarizer film 100. Structural parameters that affect the optical performance of linear polarizer 100 include, for example, $t_{110}$, $t_{114}$, $w_{111-115}$, and $\Lambda$. Typically, varying a single parameter affects multiple different performance parameters. For example, the overall transmittance of the polarizer at $\lambda_1$ can be varied by changing the width of grating lines 112 and 114 formed from a non-transmissive material, $w_{112}$ and $w_{114}$, to the width of portions 111, 113, and 115. However, while a lower ratio of, e.g., $(w_{112}+w_{114})/(w_{111}+2w_{113}+w_{115})$ may provide relatively higher transmittance of the pass state polarization, it can also result in higher transmittance of the block state polarization, which decreases $E_T$. As a result, optimizing the polarizer's performance involves trade offs between different performance parameters and the polarizer's structure and composition is varied depending on the desired performance for the polarizer's end use application.

To effectively polarize light at wavelength $\lambda_1$, the effective period $\Lambda$ of the grating layer should, in general, be shorter than $\lambda_1$, such as about $\lambda_1/4$ or less (e.g., about $\lambda_1/6$ or less, about $\lambda_1/10$ or less). Moreover, for effective broadband performance, $\Lambda$ should be shorter than the shortest wavelength in the wavelength band, $\Delta\lambda$. For a broadband polarizer in the visible spectrum, for example, $\Lambda$ should be less than about 300 nm, such as about 200 nm or less (e.g., about 150 nm or less, about 130 nm or less, about 110 nm or less, about 100 nm or less, about 90 nm or less, about 80 nm or less).

In some embodiments, $E_T$ can be increased by increasing the thickness of grating layer 110, $t_{110}$. Increasing $t_{110}$ can provide increased $E_T$ without substantially reducing the amount of pass state transmittance.

Referring now to other layers in linear polarizer film 100, in general, substrate 120 provides mechanical support to polarizer film 100. In the manufacturing process of polarizer film 100, substrate layer 120 often forms a substrate for deposition of additional materials for forming grating layer 110 and cap layer 130. In typical embodiments, where polarizer film 100 is a transmissive polarizer, substrate 120 is transparent to light at wavelength $\lambda_1$, transmitting substantially all light impinging thereon at wavelength $\lambda_1$ (e.g., about 90% or more, about 95% or more, about 97% or more, about 99% or more, about 99.5% or more).

In general, substrate 120 can be formed from any material compatible with the manufacturing processes used to produce polarizer 100 that can support the other layers. In certain embodiments, substrate 120 is formed from a glass, such as silica glass (e.g., fused quartz or fused silica, such as special UV grade fused silica), BK7 (available from Abrisa Corporation), borosilicate glass (e.g., PYREX material available from Corning), and aluminosilicate glass (e.g., C1737 available from Corning). In some embodiments, substrate 120 can be formed from a crystalline material, such as crystalline quartz or calcium fluoride (CaF2), or, in some cases, a non-linear optical crystal (e.g., LiNbO3 or a magneto-optical rotator, such as garnet) or a crystalline (or semicrystalline) semiconductor (e.g., Si, InP, or GaAs). Substrate 120 can also be formed from an inorganic material, such as a polymer (e.g., a plastic).

In certain embodiments, substrate 120 is formed from the same material as one or more of portions 111, 113, and/or 115. Embodiments in which substrate 120 is formed from the same material as one or more of portions 111, 113, and/or 115 can exhibit reduced reflection of radiation at $\lambda 1$ at the interface between grating layer 110 and substrate 120 relative, for example, to embodiments where substrate 120 is formed from a material that has a different refractive index to the materials forming portions 111, 113, and/or 115.

The structure and composition of cap layer 130 can also vary as desired. In general, cap layer 130 (along the z-direction) is provided to protect grating layer 110, encapsulating it from exposure to the environment. In certain embodiments, cap layer 130 can provide additional functionality, such as providing an optical function and/or providing a substrate for one or more additional layers.

In certain embodiments, the top surface of cap layer 130 (i.e., the surface opposite the interface between cap layer 130 and grating layer 110) can be polished smooth. One or more additional layers can be deposited on the top surface of cap layer 130.

Typically, where polarizer film 100 is a transmissive polarizer, cap layer 130 is transparent to light at wavelength $\lambda_1$, transmitting substantially all light impinging thereon at wavelength $\lambda_1$ (e.g., about 90% or more, about 95% or more, about 97% or more, about 99% or more, about 99.5% or more).

In general, cap layer 130 can be formed from any material compatible with the manufacturing processes used to produce polarizer 100 that provides the desired optical and mechanical function for the layer. In some embodiments, cap layer 130 can be formed from the same material as one or more portions 111, 113, and 115. In certain embodiments, cap layer 130 can be formed from the same material as substrate layer 120.

Cap layer 130, portions 111, 113, and 115, and substrate layer 120 can all be formed from materials that have the same or similar optical properties at $\lambda_1$. For example, these layers and portions can be formed from $SiO_2$ and/or materials with the same or similar optical properties as $SiO_2$ at $\lambda_1$. In such embodiments, overall transmission of radiation at $\lambda_1$ can be higher than in embodiments where one or more of the layers 120 and 130 and/or portions 111, 113, and/or 115 are formed materials have differing optical properties at $\lambda_1$.

Turning now to the theoretical performance of some exemplary structures, FIG. 1E-1G show plots of the optical properties of a grating layer having following structure summarized in Table II:

TABLE II

Exemplary polarizer film parameters for simulation.

| | |
|---|---|
| $p_{110}$ | 147 nm |
| $t_{110}$ | 180 nm |
| Composition of lines 112 | $TiO_2$ |
| $w_{112}$ | 7 nm |
| Composition of lines 114 | $TiO_2$ |
| $w_{114}$ | 7 nm |
| $t_{114}$ | 160 nm |
| Composition of portions 111 | $SiO_2$ |
| $w_{111}$ | 29 nm |
| Composition of portions 113 | $SiO_2$ |
| $w_{113}$ | 20 nm |
| Composition of portions 115 | $SiO_2$ |
| $w_{115}$ | 50 nm |
| Composition of substrate | UV Grade Fused Silica |
| Composition of cap layer | $SiO_2$ |

TABLE III

Simulated optical performance for different incident angles.

| Incident Angle | Extinction Ratio | Pass state transmission |
|---|---|---|
| 0° | 28 dB | 72.7% |
| 5° | 28 dB | 71.5% |
| 10° | 27.9 dB | 67.6% |
| 15° | 27.5 dB | 61.8% |
| 20° | 27 dB | 54.6% |

All plots are for normally incident radiation. FIG. 1E shows the extinction ration as a function of wavelength for the wavelength range from 200 nm to 500 nm. Peak extinction ratio of about 50 occurs around 300 nm for the data points shown.

For the same wavelength range, FIG. 1F shows the total pass state energy that is either transmitted or reflected by the polarizer. Note here that at shorter wavelengths, a relatively large amount of pass state radiation is absorbed by the polarizer, hence a total transmitted/reflected energy of 0.5 or lower for wavelengths close to 200 nm. Conversely, at wavelengths closer to 350 nm and above, the polarizer absorption is relatively low, resulting in substantially all pass state radiation either being transmitted or absorbed by the polarizer.

FIG. 1G shows pass state transmission for wavelengths from 200 nm to 500 nm. At least 50% of pass state radiation is transmitted for wavelengths above 250 nm for the wavelength range shown.

Off axis optical performance was also calculated for the exemplary polarizer film. Extinction ratio and pass state transmission for several incident angles are shown in Table III. This data is calculated for a wavelength of 266 nm.

The data in FIGS. 1E-1G were generated using the MATLAB grating diffraction calculator GD-Calc® obtained from KJ Innovation. For the purposes of the simulations, the following refractive index data was used: for TiO2, n=1.6 and k=3.2; and for SiO2, n=1.5.

In general, linear polarizer film 100 can be prepared in a variety of ways. Generally, polarizer films are prepared using deposition and patterning techniques commonly used in the fabrication of integrated circuits. Deposition techniques that can be used include sputtering (e.g., radio frequency sputtering), evaporating (e.g., electron beam evaporation, ion assisted deposition (IAD) electron beam evaporation), or chemical vapor deposition (CVD) such as plasma enhanced CVD (PECVD), atomic layer deposition (ALD), or by oxidization. Patterning can be performed using lithographic and etching techniques, such as electron beam lithography, photolithography (e.g., using a photomask or using holographic techniques), and imprint lithography. Etching techniques include, for example, reactive ion etching, ion beam etching, sputtering etching, chemical assisted ion beam etching (CAIBE), or wet etching.

A discussion of techniques for forming grating structures that can be applied to the structures described herein are discussed in U.S. Patent Publication No. US 2005-0277063 A1, entitled "OPTICAL FILMS AND METHODS OF MAKING THE SAME," filed on May 27, 2005, the entire contents of which is incorporated herein by reference. In some embodiments, multiple polarizers can be prepared simultaneously by forming a relatively large grating layer on a single substrate, which is then diced into individual units. For example, a grating layer can be formed on a substrate that has a single-side surface area about 10 square inches or more (e.g., a four inch, six inch, or eight inch diameter substrate). After forming the grating layer, the substrate can be diced into multiple units of smaller size (e.g., having a single-side surface area of about one square inch or less).

Figure 2A:
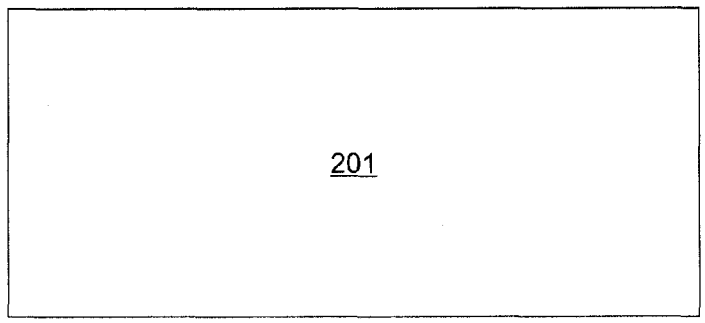
FIG. 2A-2J are cross-sectional views of an article during various process steps in an implementation of a process for making a linear polarizer film.

Referring now to FIGS. 2A-2J, in some embodiments, a grating layer with a short effective period is formed by depositing a material onto the side walls of portions of a primary grating having a relatively longer period. FIG. 2A shows a cross-sectional view of a blank substrate 201 on which a grating layer is to be formed. Typically, blank substrate 201 is formed from the same material as the substrate layer. For example, blank substrate 201 can be a piece of silica or quartz.

Figure 2B:
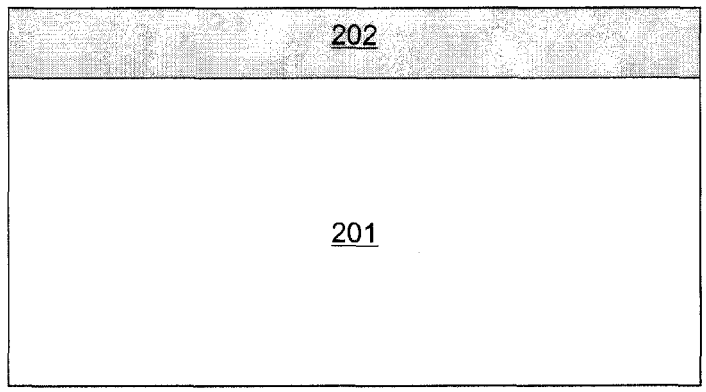

Referring to FIG. 2B, in an initial step, a layer 202 of a resist material is deposited onto a surface of blank substrate 201. In general, the type of resist is selected based its suitability for processing the blank substrate. In some embodiments, a polymeric resist can be used. In certain embodiments, the resist is a metal, such as aluminum or chrome. Multilayer resists can be used.

Figure 2C:
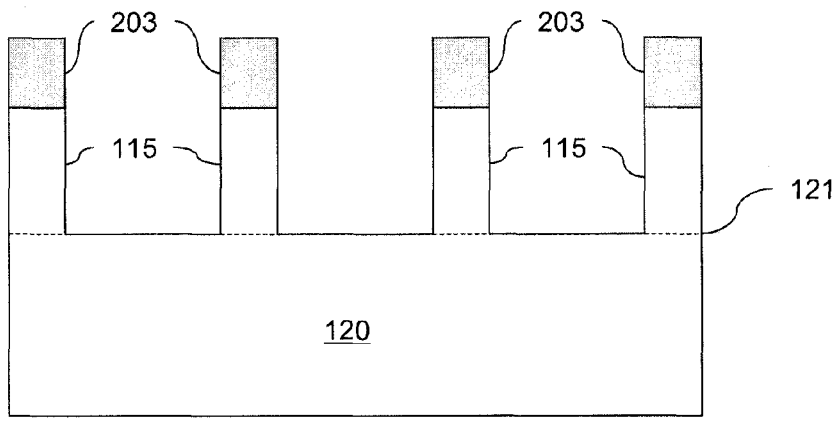

Referring to FIG. 2C, layer 202 is patterned to provide a mask for blank substrate 201. The mask is depicted as portions 203 in FIG. 2C. The width of portions 203 corresponds to the width of portions 115 in the grating layer being formed.

After layer 202 is patterned, blank substrate 201 is etched to provide portions 115. Blank substrate 201 is etched a desired depth corresponding to the thickness of the grating layer. In FIG. 2C, the blank substrate is etched to a depth indicated by line 121, which represents the interface between substrate layer 120 and the grating layer which will be formed on the substrate layer.

Figure 2D:
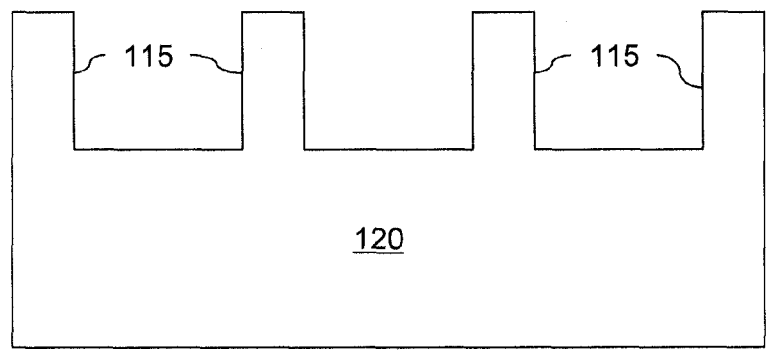

Referring to FIG. 2D, the portions 203 of the resist mask are removed, leaving behind substrate layer 120 and portions 115.

Figure 2E:
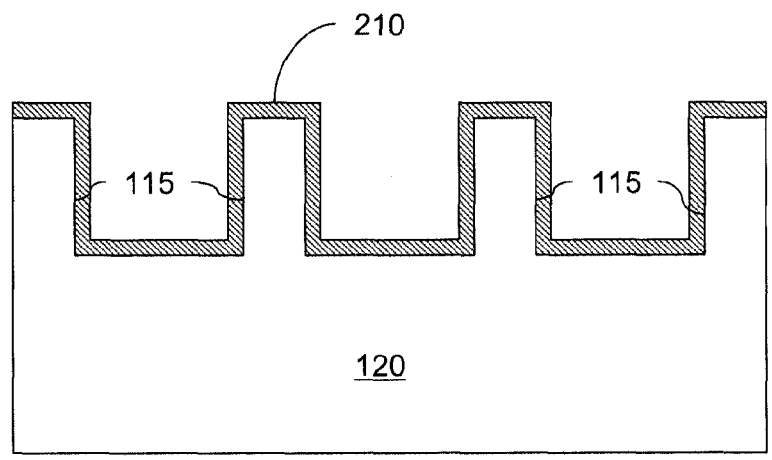

Next, as shown in FIG. 2E, a conformal layer 210 of a first material is formed over portions 115 and in the trenches between these portions. The conformal layer 210 forms a layer on the sidewalls of portions 115 that is the same thickness as the layer deposited in the trenches between the portions and the layer formed on top of portions 115. Conformal layer 210 is a precursor for grating lines 112. Accordingly, conformal layer 210 is formed from the material used for grating lines 112 and the thickness of conformal layer 210 corresponds to the desired width of grating lines 112. In certain embodiments, atomic layer deposition is used to form conformal layer 210. Atomic layer deposition is described in more detail below.

Figure 2F:
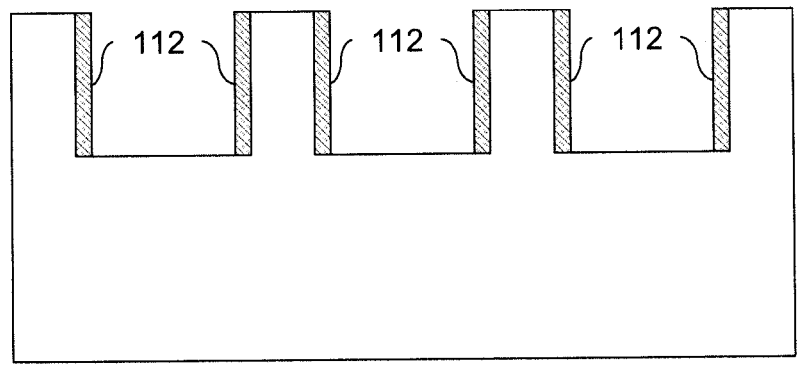

In a following step, with reference to FIG. 2F, the conformal layer is anisotropically etched, removing the portions of the layer between portions 115 and on top of portions 115, but leaving behind the sidewalls of portions 115. These sidewalls form grating lines 112. For example, reactive ion etching can be used. In some embodiments, reactive ion etching using oxygen and CHF3 gas (e.g., 0.5 sccm of O2 and 5 sccm of CHF3) with approximately 100-130 W power.

Figure 2G:
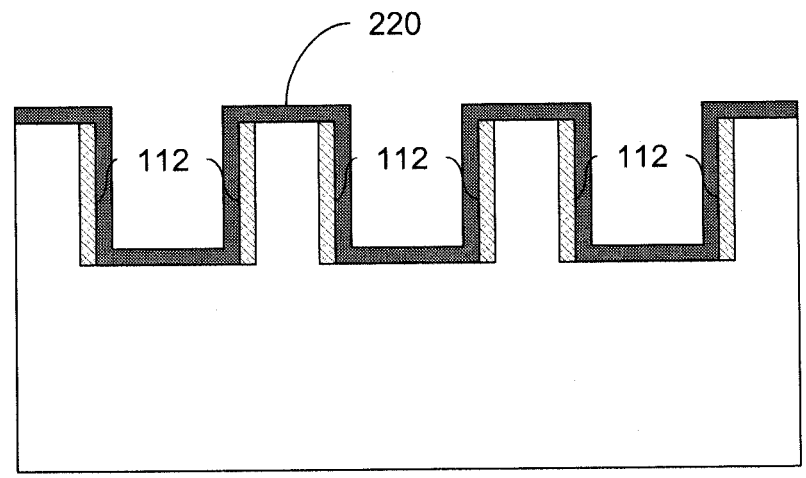

Following the etch step, a second conformal layer 220 is formed over portions 115, grating lines 112, and between the trenches between grating lines 112 as shown in FIG. 2G. Second conformal layer 220 is a precursor for portions 113 and is therefore formed from the material used for portions 113 and the thickness of conformal layer 220 corresponds to the width of portions 113. In some embodiments, second conformal layer is formed from a material having similar or identical optical properties to the material forming portions 115. Second conformal layer 220 can also be formed using atomic layer deposition.

Figure 2H:
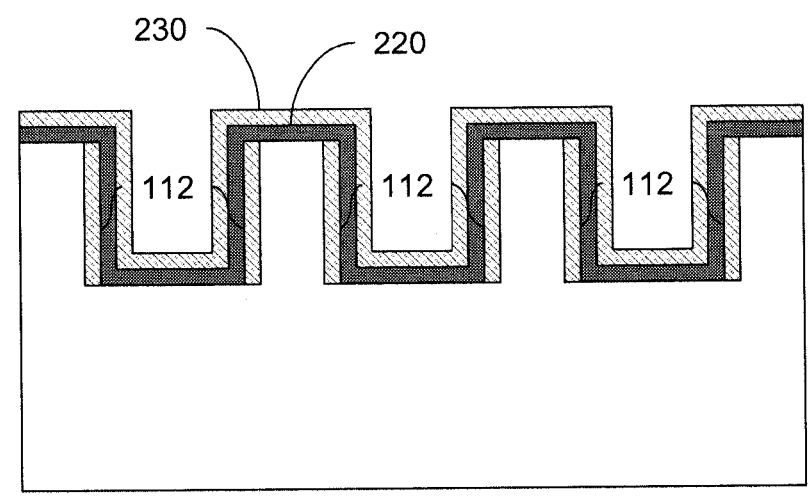

Next, referring to FIG. 2H, a third conformal layer 230 is formed over second conformal layer 220. Third conformal layer 230 is a precursor for grating lines 114 and is formed from the material used for grating lines 114. The thickness of conformal layer 230 corresponds to the width of grating lines 114.

Figure 2I:
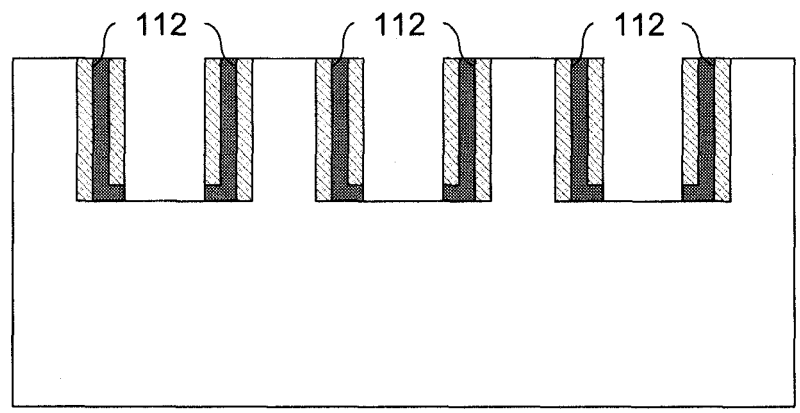
Figure 2J:
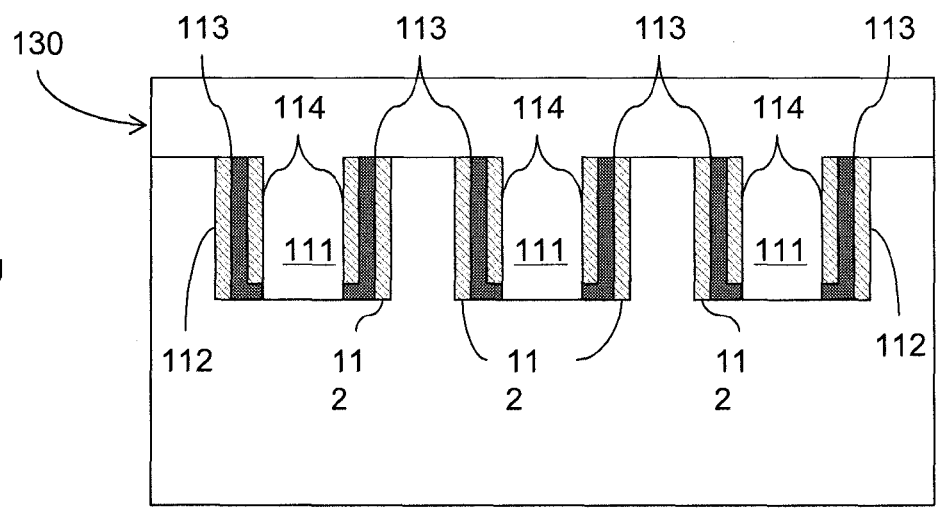

Referring to FIG. 2I, in a further anisotropic etch step, portions of second conformal layer 220 and third conformal layer 230 are removed, leaving behind portions 113 and grating lines 114, respectively. In certain embodiments, third conformal layer 230 but not second conformal layer 220 is etched.

Finally, the remaining trenches between grating lines 114 are filled to provide portions 111. Additional material is deposited over grating layer 110 to provide cap layer 130. In embodiments, the portions 111 and cap layer 130 are formed in a single deposition step. Either or both of portions 111 and cap layer 130 can be formed using atomic layer deposition.

In some embodiments, second conformal layer 220 is etched prior to deposition of third conformal layer 230. In such cases, grating lines 114 have the same thickness as grating lines 112.

Figure 3:
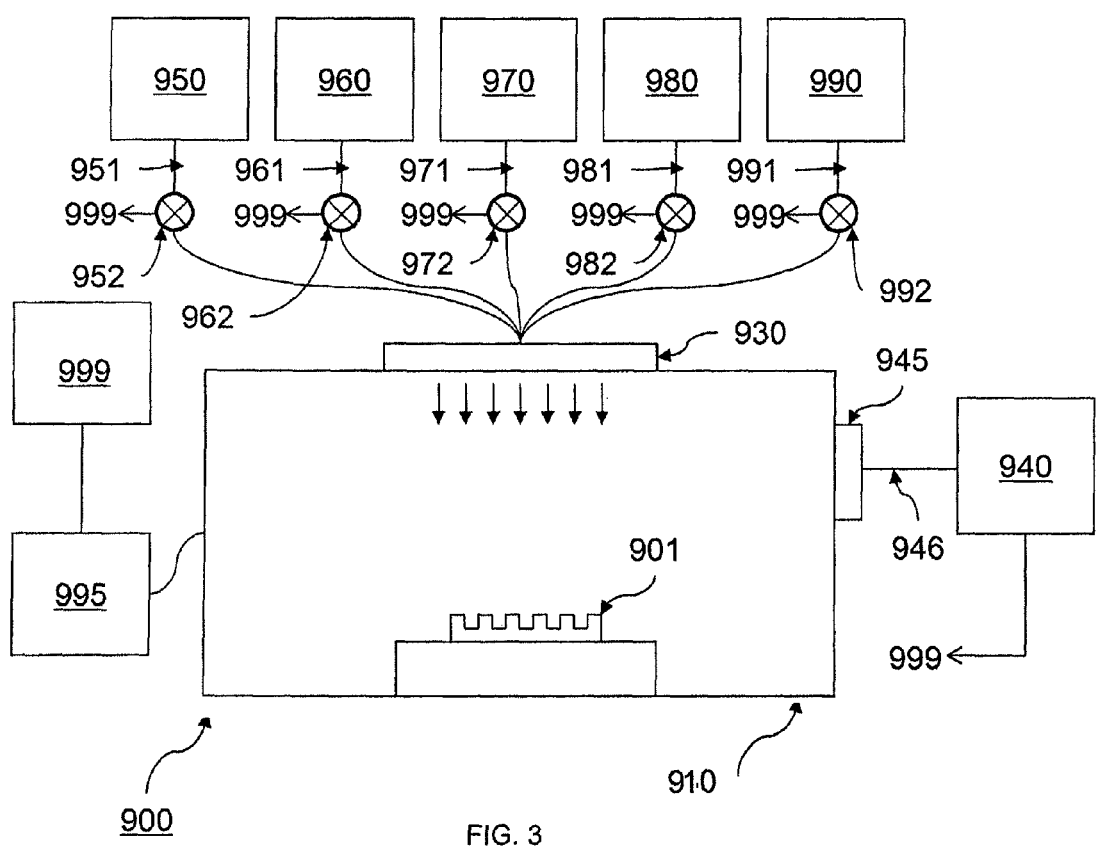
FIG. 3 is a schematic diagram of a system for performing atomic layer deposition.

As discussed above, in some embodiments, certain portions of the grating layer and/or other layers are prepared using atomic layer deposition (ALD). Referring to FIG. 3, an ALD system 900 can be used to conformally deposit material on an intermediate article 901. Conformal deposition by ALD occurs monolayer by monolayer, providing substantial control over the composition and thickness of the depositions. During deposition of a monolayer, vapors of a precursor are introduced into the chamber and are adsorbed onto exposed surfaces of article 901 or previously deposited monolayers adjacent these surfaces. Subsequently, a reactant is introduced into the chamber that reacts chemically with the adsorbed precursor, forming a monolayer of a desired material. The self-limiting nature of the chemical reaction on the surface can provide precise control of film thickness and large-area uniformity of the deposited layer. Moreover, the non-directional adsorption of precursor onto each exposed surface provides for uniform deposition of material onto the exposed surfaces, regardless of the orientation of the surface relative to chamber B. Accordingly, the layers of the nanolaminate film conform to the shape of the trenches of intermediate article 901.

ALD system 900 includes a reaction chamber 910, which is connected to sources 950, 960, 970, 980, and 990 via a manifold 930. Sources 950, 960, 970, 980, and 990 are connected to manifold 930 via supply lines 951, 961, 971, 981, and 991, respectively. Valves 952, 962, 972, 982, and 992 regulate the flow of gases from sources 950, 960, 970, 980, and 990, respectively. Sources 950 and 980 contain a first and second precursor, respectively, while sources 960 and 990 include a first reagent and second reagent, respectively. Source 970 contains a carrier gas, which is constantly flowed through chamber 910 during the deposition process transporting precursors and reagents to article 901, while transporting reaction byproducts away from the substrate. Precursors and reagents are introduced into chamber 910 by mixing with the carrier gas in manifold 930. Gases are exhausted from chamber 910 via an exit port 945. A pump 940 exhausts gases from chamber 910 via an exit port 945. Pump 940 is connected to exit port 945 via a tube 946.

ALD system 900 includes a temperature controller 995, which controls the temperature of chamber 910. During deposition, temperature controller 995 elevates the temperature of article 901 above room temperature. In general, the temperature should be sufficiently high to facilitate a rapid reaction between precursors and reagents, but should not damage the substrate. In some embodiments, the temperature of article 901 can be about 500° C. or less (e.g., about 400° C. or less, about 300° C. or less, about 200° C. or less, about 150° C. or less, about 125° C. or less, about 100° C. or less).

Typically, the temperature should not vary significantly between different portions of article 901. Large temperature variations can cause variations in the reaction rate between the precursors and reagents at different portions of the substrate, which can cause variations in the thickness and/or morphology of the deposited layers. In some embodiments, the temperature between different portions of the deposition surfaces can vary by about 40° C. or less (e.g., about 30° C. or less, about 20° C. or less, about 10° C. or less, about 5° C. or less).

Deposition process parameters are controlled and synchronized by an electronic controller 999. Electronic controller 999 is in communication with temperature controller 995; pump 940; and valves 952, 962, 972, 982, and 992. Electronic controller 999 also includes a user interface, from which an operator can set deposition process parameters, monitor the deposition process, and otherwise interact with system 900.

Figure 4:
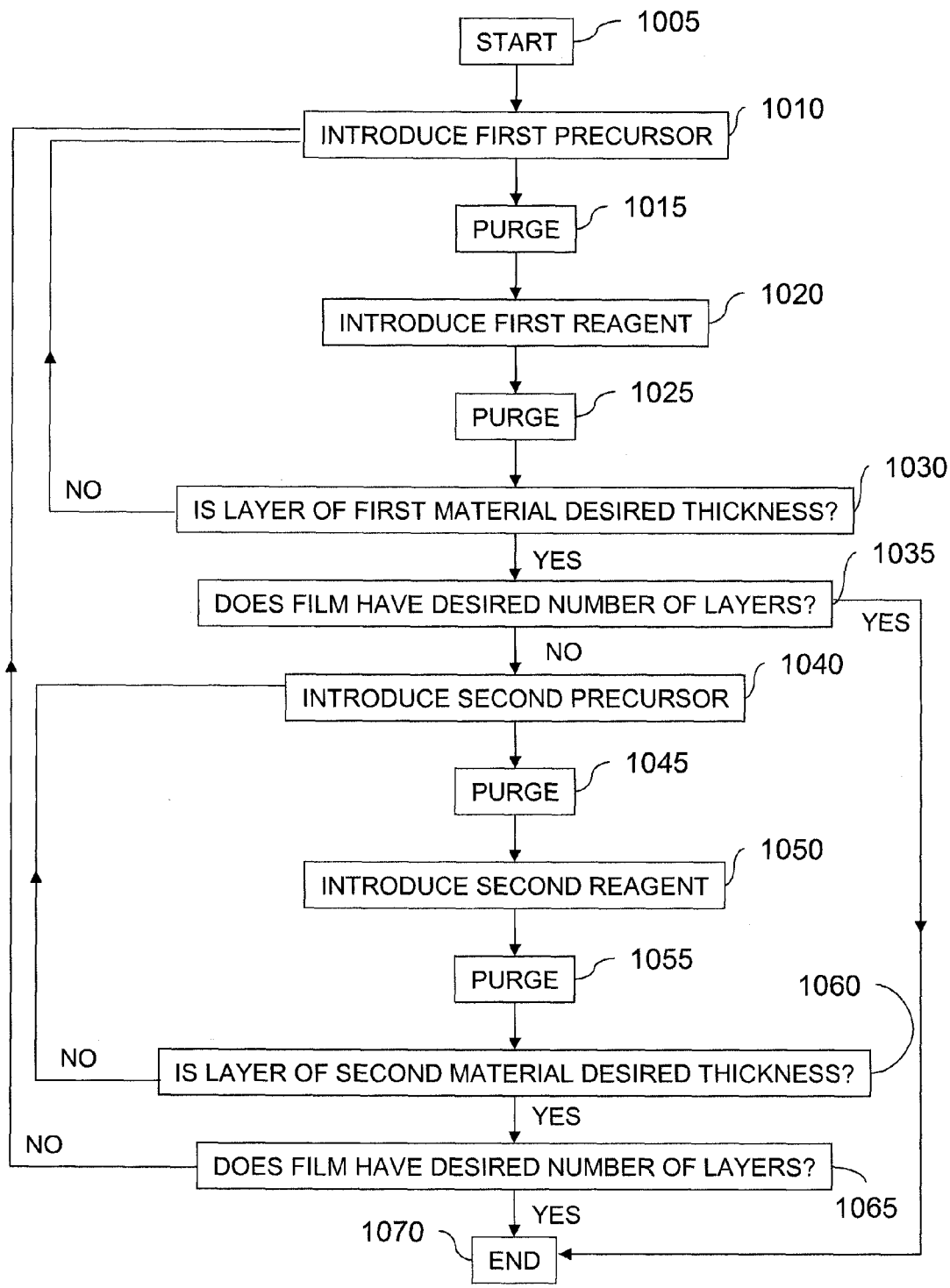
FIG. 4 is a flowchart showing steps in an atomic layer deposition method.

Referring to FIG. 4, the ALD process is started (1005) when system 900 introduces the first precursor from source 950 into chamber 910 by mixing it with carrier gas from source 970 (1010). A monolayer of the first precursor is adsorbed onto exposed surfaces of article 901, and residual precursor is purged from chamber 910 by the continuous flow of carrier gas through the chamber (1015). Next, the system introduces a first reagent from source 960 into chamber 910 via manifold 930 (1020). The first reagent reacts with the monolayer of the first precursor, forming a monolayer of the first material. As for the first precursor, the flow of carrier gas purges residual reagent from the chamber (1025). Steps 1010 through 1025 are repeated until the layer of the first material reaches a desired thickness (1030).

In embodiments where the films are a single layer of material, the process ceases once the layer of first material reaches the desired thickness (1035). However, for a nanolaminate film, the system introduces a second precursor into chamber 910 through manifold 930 (1040). A monolayer of the second precursor is adsorbed onto the exposed surfaces of the deposited layer of first material and carrier gas purges the chamber of residual precursor (1045). The system then introduces the second reagent from source 980 into chamber 910 via manifold 930. The second reagent reacts with the monolayer of the second precursor, forming a monolayer of the second material (1050). Flow of carrier gas through the chamber purges residual reagent (1055). Steps 580 through 510 are repeated until the layer of the second material reaches a desired thickness (1060).

Additional layers of the first and second materials are deposited by repeating steps 1040 through 1055. Once the desired number of layers are formed (1065) (e.g., the trenches are filled and/or cap layer has a desired thickness), the process terminates (1070), and the coated article is removed from chamber 910.

Although the precursor is introduced into the chamber before the reagent during each cycle in the process described above, in other examples the reagent can be introduced before the precursor. The order in which the precursor and reagent are introduced can be selected based on their interactions with the exposed surfaces. For example, where the bonding energy between the precursor and the surface is higher than the bonding energy between the reagent and the surface, the precursor can be introduced before the reagent. Alternatively, if the binding energy of the reagent is higher, the reagent can be introduced before the precursor.

The thickness of each monolayer generally depends on a number of factors. For example, the thickness of each monolayer can depend on the type of material being deposited. Materials composed of larger molecules may result in thicker monolayers compared to materials composed of smaller molecules.

The temperature of the article can also affect the monolayer thickness. For example, for some precursors, a higher temperature can reduce adsorption of a precursor onto a surface during a deposition cycle, resulting in a thinner monolayer than would be formed if the substrate temperature were lower.

The type or precursor and type of reagent, as well as the precursor and reagent dosing can also affect monolayer thickness. In some embodiments, monolayers of a material can be deposited with a particular precursor, but with different reagents, resulting in different monolayer thickness for each combination. Similarly, monolayers of a material formed from different precursors can result in different monolayer thickness for the different precursors.

Examples of other factors which may affect monolayer thickness include purge duration, residence time of the precursor at the coated surface, pressure in the reactor, physical geometry of the reactor, and possible effects from the byproducts on the deposited material. An example of where the byproducts affect the film thickness are where a byproduct etches the deposited material. For example, HCl is a byproduct when depositing $TiO_2$ using a $TiCl_4$ precursor and water as a reagent. HCl can etch the deposited $TiO_2$ before it is exhausted. Etching will reduce the thickness of the deposited monolayer, and can result in a varying monolayer thickness across the substrate if certain portions of the substrate are exposed to HCl longer than other portions (e.g., portions of the substrate closer to the exhaust may be exposed to byproducts longer than portions of the substrate further from the exhaust).

Typically, monolayer thickness is between about 0.1 nm and about five nm. For example, the thickness of one or more of the deposited monolayers can be about 0.2 nm or more (e.g., about 0.3 nm or more, about 0.5 nm or more). In some embodiments, the thickness of one or more of the deposited monolayers can be about three nm or less (e.g., about two nm, about one nm or less, about 0.8 nm or less, about 0.5 nm or less).

The average deposited monolayer thickness may be determined by depositing a preset number of monolayers on a substrate to provide a layer of a material. Subsequently, the thickness of the deposited layer is measured (e.g., by ellipsometry, electron microscopy, or some other method). The average deposited monolayer thickness can then be determined as the measured layer thickness divided by the number of deposition cycles. The average deposited monolayer thickness may correspond to a theoretical monolayer thickness.

The theoretical monolayer thickness refers to a characteristic dimension of a molecule composing the monolayer, which can be calculated from the material's bulk density and the molecules molecular weight. For example, an estimate of the monolayer thickness for $SiO_2$ is ~0.37 nm. The thickness is estimated as the cube root of a formula unit of amorphous $SiO_2$ with density of 2.0 grams per cubic centimeter.

In some embodiments, average deposited monolayer thickness can correspond to a fraction of a theoretical monolayer thickness (e.g., about 0.2 of the theoretical monolayer thickness, about 0.3 of the theoretical monolayer thickness, about 0.4 of the theoretical monolayer thickness, about 0.5 of the theoretical monolayer thickness, about 0.6 of the theoretical monolayer thickness, about 0.7 of the theoretical monolayer thickness, about 0.8 of the theoretical monolayer thickness, about 0.9 of the theoretical monolayer thickness). Alternatively, the average deposited monolayer thickness can correspond to more than one theoretical monolayer thickness up to about 30 times the theoretical monolayer thickness (e.g., about twice or more than the theoretical monolayer thickness, about three time or more than the theoretical monolayer thickness, about five times or more than the theoretical monolayer thickness, about eight times or more than the theoretical monolayer thickness, about 10 times or more than the theoretical monolayer thickness, about 20 times or more than the theoretical monolayer thickness).

During the deposition process, the pressure in chamber 910 can be maintained at substantially constant pressure, or can vary. Controlling the flow rate of carrier gas through the chamber generally controls the pressure. In general, the pressure should be sufficiently high to allow the precursor to saturate the surface with chemisorbed species, the reagent to react completely with the surface species left by the precursor and leave behind reactive sites for the next cycle of the precursor. If the chamber pressure is too low, which may occur if the dosing of precursor and/or reagent is too low, and/or if the pump rate is too high, the surfaces may not be saturated by the precursors and the reactions may not be self limited. This can result in an uneven thickness in the deposited layers. Furthermore, the chamber pressure should not be so high as to hinder the removal of the reaction products generated by the reaction of the precursor and reagent. Residual byproducts may interfere with the saturation of the surface when the next dose of precursor is introduced into the chamber. In some embodiments, the chamber pressure is maintained between about 0.01 Torr and about 100 Torr (e.g., between about 0.1 Torr and about 20 Torr, between about 0.5 Torr and 10 Torr, such as about 1 Torr).

Generally, the amount of precursor and/or reagent introduced during each cycle can be selected according to the size of the chamber, the area of the exposed substrate surfaces, and/or the chamber pressure. The amount of precursor and/or reagent introduced during each cycle can be determined empirically.

The amount of precursor and/or reagent introduced during each cycle can be controlled by the timing of the opening and closing of valves 952, 962, 982, and 992. The amount of precursor or reagent introduced corresponds to the amount of time each valve is open each cycle. The valves should open for sufficiently long to introduce enough precursor to provide adequate monolayer coverage of the substrate surfaces. Similarly, the amount of reagent introduced during each cycle should be sufficient to react with substantially all precursor deposited on the exposed surfaces. Introducing more precursor and/or reagent than is necessary can extend the cycle time and/or waste precursor and/or reagent. In some embodiments, the precursor dose corresponds to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more). Similarly, the reagent dose can correspond to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more).

The time between precursor and reagent doses corresponds to the purge. The duration of each purge should be sufficiently long to remove residual precursor or reagent from the chamber, but if it is longer than this it can increase the cycle time without benefit. The duration of different purges in each cycle can be the same or can vary. In some embodiments, the duration of a purge is about 0.1 seconds or more (e.g., about 0.2 seconds or more, about 0.3 seconds or more, about 0.4 seconds or more, about 0.5 seconds or more, about 0.6 seconds or more, about 0.8 seconds or more, about one second or more, about 1.5 seconds or more, about two seconds or more). Generally, the duration of a purge is about 10 seconds or less (e.g., about eight seconds or less, about five seconds or less, about four seconds or less, about three seconds or less).

The time between introducing successive doses of precursor corresponds to the cycle time. The cycle time can be the same or different for cycles depositing monolayers of different materials. Moreover, the cycle time can be the same or different for cycles depositing monolayers of the same material, but using different precursors and/or different reagents. In some embodiments, the cycle time can be about 20 seconds or less (e.g., about 15 seconds or less, about 12 seconds or less, about 10 seconds or less, about 8 seconds or less, about 7 seconds or less, about 6 seconds or less, about 5 seconds or less, about 4 seconds or less, about 3 seconds or less). Reducing the cycle time can reduce the time of the deposition process.

The precursors are generally selected to be compatible with the ALD process, and to provide the desired deposition materials upon reaction with a reagent. In addition, the precursors and materials should be compatible with the material on which they are deposited (e.g., with the substrate material or the material forming the previously deposited layer). Examples of precursors include chlorides (e.g., metal chlorides), such as $TiCl_4$, $SiCl_4$, $SiH_2Cl_2$, $TaCl_3$, $HfCl_4$, $InCl_3$ and $AlCl_3$. In some embodiments, organic compounds can be used as a precursor (e.g., Ti-ethaOxide, Ta-ethaOxide, Nb-ethaOxide). Another example of an organic compound precursor is $(CH_3)_3Al$. For $SiO_2$ deposition, for example, suitable precursors include Tris(tert-butoxy), Tris(tert-pentoxy) silanol, or tetraethoxysilane (TEOS).

The reagents are also generally selected to be compatible with the ALD process, and are selected based on the chemistry of the precursor and material. For example, where the material is an oxide, the reagent can be an oxidizing agent. Examples of suitable oxidizing agents include water, hydrogen peroxide, oxygen, ozone, $(CH_3)_3Al$, and various alcohols (e.g., Ethyl alcohol $CH_3OH$). Water, for example, is a suitable reagent for oxidizing precursors such as $TiCl_4$ to obtain $TiO_2$, $AlCl_3$ to obtain $Al_2O_3$, and Ta-ethaoxide to obtain $Ta_2O_5$, Nb-ethaoxide to obtain $Nb_2O_5$, $HfCl_4$ to obtain $HfO_2$, $ZrCl_4$ to obtain $ZrO_2$, and $InCl_3$ to obtain $In_2O_3$. In each case, HCl is produced as a byproduct. In some embodiments, $(CH_3)_3Al$ can be used to oxidize silanol to provide $SiO_2$.

Figure 5:
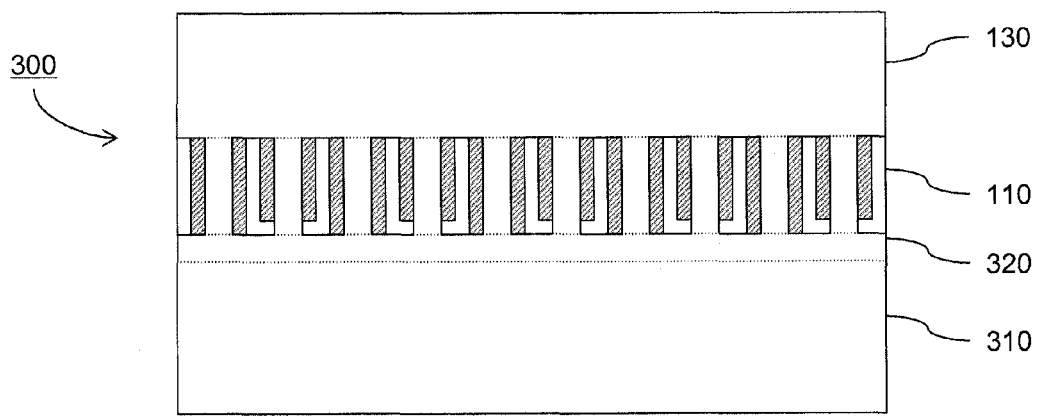
FIG. 5 is a cross-sectional view of an embodiment of a polarizer film.

While the foregoing discussion of polarizer film 100 and associated manufacturing methods refer to the embodiment shown in FIGS. 1A-1C, in general, other embodiments are also possible. For example, embodiments of polarizing films can include additional layers to grating layer 110, substrate layer 120, and cap layer 130. Referring to FIG. 5, for example, a polarizer film 300 includes an etch stop layer 320 between a substrate layer 310 and grating layer 110.

Etch stop layer 320 is formed from a material resistant to etching processes used to etch the material(s) from which portions 115 and/or grating lines 112 and/or 114 are formed. The material(s) forming etch stop layer 320 should also be compatible with substrate layer 310 and with the materials forming grating layer 110. Examples of materials that can form etch stop layer 320 include $HfO_2$, $SiO_2$, $Ta_2O_5$, $TiO_2$, $SiN_x$, or metals (e.g., Cr, Ti, Ni).

The thickness of etch stop layer 320 can be varied as desired. Typically, etch stop layer 320 is sufficiently thick to prevent significant etching of substrate layer 310, but should not be so thick as to adversely impact the optical performance of polarizer film 300. In some embodiments, etch stop layer 320 is about 500 nm or less (e.g., about 250 nm or less, about 100 nm or less, about 75 nm or less, about 50 nm or less, about 40 nm or less, about 30 nm or less, about 20 nm or less).

In some embodiments, polarizer films can include further additional layers. For example, antireflection films on one or both surfaces of a polarizer film can reduce the reflectance of pass state light of wavelength $\lambda_1$ impinging on and/or exiting a polarizer film. Antireflection films generally include one or more layers of different refractive index. As an example, antireflection films can be formed from four alternating relatively high and relatively low index layers. The relatively high index layers can be formed, for example, from $TiO_2$ or $Ta_2O_5$ and the relatively low index layers can be formed, for example, from $SiO_2$ or $MgF_2$. The antireflection films can be broadband antireflection films or narrowband antireflection films.

In some embodiments, polarizer films have a reflectance of about 5% or less of light impinging thereon at wavelength $\lambda$ for pass state polarization (e.g., about 3% or less, about 2% or less, about 1% or less, about 0.5% or less, about 0.2% or less).

Figure 6:
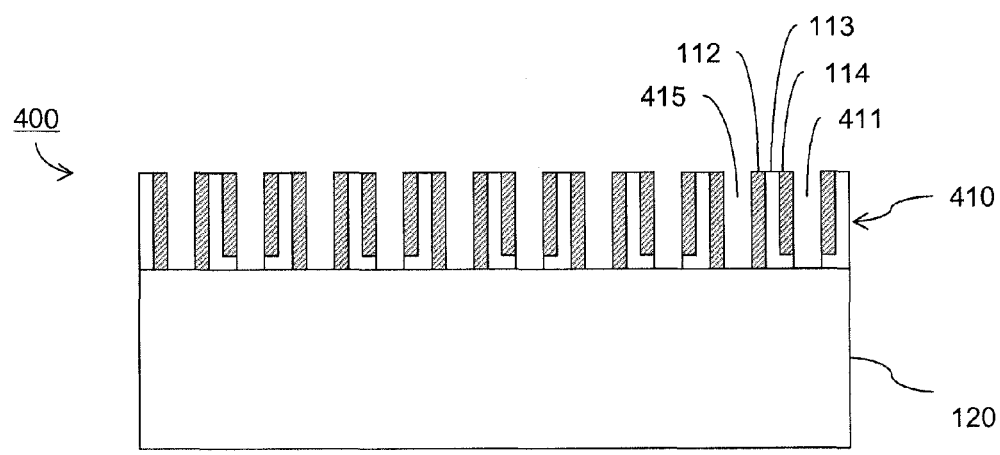
FIG. 6 is a cross-sectional view of an embodiment of a polarizer film.

While grating layer 110 in polarizer films 100 and 300 is a monolithic layer (i.e., there are no gaps between the different portions of the layer), embodiments can include some portions or grating lines that are adjacent to gaps. For example, referring to FIG. 6, a polarizer film 400 includes a grating layer 410 in which each grating line 112 and 114 is adjacent a portion 113 formed from a different material on one side, and adjacent a gap 411 or 415 on the opposite side. In the context of the grating layer formation process discussed above, such a grating layer can be formed, for example, by not depositing portions 111 and by etching away portions 115 after formation of grating lines 112 and 114.

In certain embodiments, only grating lines 114 are adjacent gaps, while grating lines 112 are separated by portions of a solid material. Such a grating layer can be formed, for example, by not depositing portions 111 or cap layer 130 over the grating layer. Alternatively, in some embodiments, grating lines 112 are adjacent solid portions while grating lines 114 are separated by gaps. This can be accomplished by etching portions 115 after depositing portions 111, for example.

Figure 7A:
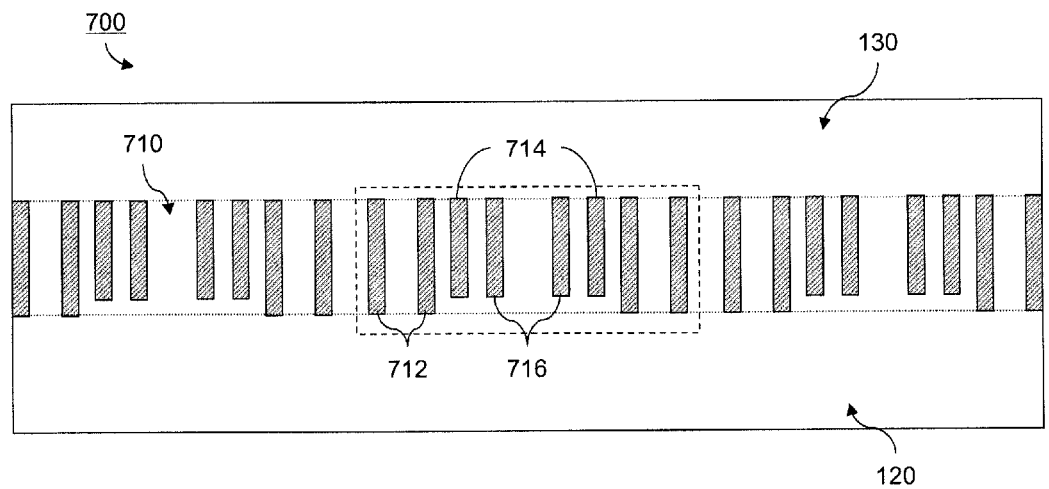
FIGS. 7A and 7B are a cross-sectional views of an embodiment of a polarizer film.
Figure 7B:
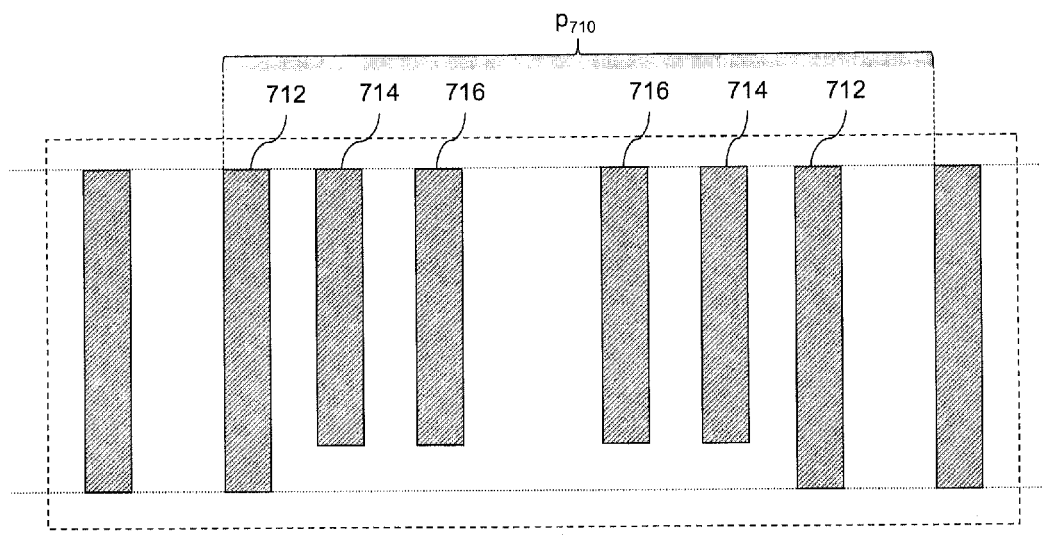

The grating layers in polarizer films 100, 300, and 400 each include a repeating structure that includes four grating lines (i.e., two grating lines 112 and two grating lines 114). More generally, grating layers can include repeating structures having more than four grating lines. For example, referring to FIGS. 7A and 7B, a polarizer film 700 includes a grating layer 710 that has a repeating structure that includes six grating lines, including two grating lines 712, two grating lines 714, and two grating lines 716. The repeating structure has a pitch $p_{710}$, and the grating lines have an effective period $\Lambda_{710}$ equal to $p_{710}/6$.

Referring back to FIGS. 2A-2J, additional grating lines can be formed, for example, by depositing additional conformal layers over portions 115, grating lines 112, portions 113, and grating lines 114, and subsequently anisotropically etching the additional conformal layers before depositing portions 111.

Additional grating lines can be formed by repeating this process as necessary. For example, in certain embodiments, each repeating structure in a grating layer can include eight grating lines, ten grating lines, or more.

While certain embodiments have been described, in general, other linear polarizer structures are also possible. For example, while FIGS. 1A-1C, 5, 6, 7A and 7B show a variety of configurations of polarizer films, other embodiments can include additional or fewer layers. For example, in some embodiments, polarizers can also include protective layers, such as hardcoat layers (e.g., hardcoat polymers).

Furthermore, while embodiments of polarizers have been described that include a grating layer that has grating lines with a rectangular grating profile, other embodiments are also possible. For example, in some embodiments, the grating layer have a curved profile, such as a sinusoidal profile. Alternatively, the grating layer can have a triangular profile, sawtooth profile, or trapezoidal profile. Moreover, in general, the profile of grating layers may vary slightly from its designated geometry (e.g., rectangular, triangular, trapezoidal) due to imperfections associated with the manufacturing process.

Polarizer films such as those described herein can be incorporated into optical devices, including passive optical devices (e.g., polarizing devices) and active optical devices (e.g., liquid crystal displays). Polarizer films can be integrated into the device, providing a monolithic device, or can be arranged separately from other components of the device.

Figure 8:
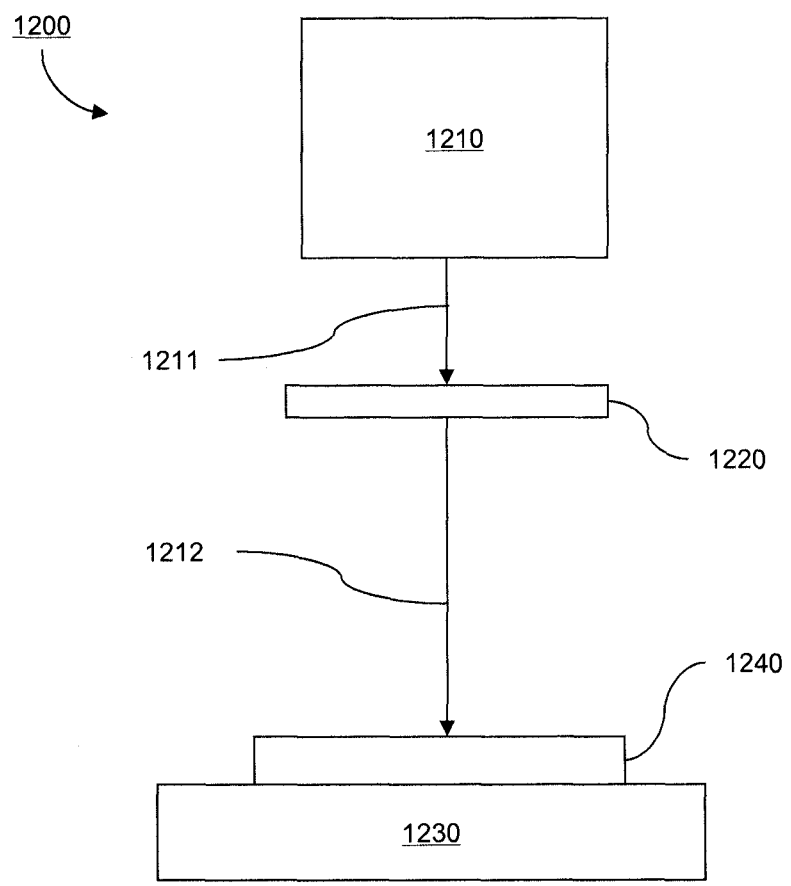
FIG. 8 is a schematic diagram of a system utilizing a linear polarizer film.

In certain embodiments, polarizer films can be used in applications to provide polarized UV radiation to a substrate. Referring to FIG. 8, a UV exposure system 1200 includes a UV source 1210, a polarizer film 1220, and a substrate support 1230 configured to position a substrate 1240 to receive radiation from UV source 1210. Radiation 1211 emitted from source 1210 passes through polarizer film 1220, emerging as polarized radiation 1212 directed to substrate 1240. Optionally, system 1200 can include optical elements between source 1210 and polarizer film 1220 and/or between polarizer film 1220 and substrate 1240. The optical elements can be used to control (e.g., homogenize) the illumination of the substrate by source 1210. As an example, in some embodiments, UV exposure system 1200 can be used to expose liquid crystal alignment layers, e.g., on a surface of an LCD panel.

As another example, polarizer films can be used in lithography exposure tools that utilize UV radiation to expose resist layers on wafers or LCD substrates. For example, polarizer films can be produced to operate at wavelengths commonly used in lithography tools, such as 248 nm, 193 nm, and/or 157 nm. Polarizers can be included in the illumination systems (optical systems for delivering radiation from a light source to a reticle) and/or projection systems (optical system for imaging the reticle onto a resist on a substrate) of lithography tools.

UV polarizers can also be used in the metrology system for wafer inspection (e.g., such as in commercially-available metrology systems like the Surfscan systems available from KLA-Tencor, San Jose, Calif.), where narrowband UV light (e.g., at about 266 nm) and/or broadband UV light (e.g., from about 240 nm to about 450 nm) is used to illuminate wafers and detect light reflected from the wafers. Information about the wafers can be determined based on the reflected light. UV polarizers can be used to polarize the incident illumination and/or analyze the reflected illumination, thereby providing polarization-dependent information about the wafer and/or enhancing the resolution of the system relative to systems that utilize unpolarized light.

A number of embodiments have been described. Other embodiments are in the following claims.

What is claimed is:

1. A method, comprising:
   providing a layer comprising a plurality of spaced-apart lines of a first material extending along a first direction;
   forming a line of a second material on opposing surfaces of each line of the first material, the first and second materials being different and adjacent lines of the second material being discontinuous;
   after forming the lines of the second material, forming pairs of spaced-apart lines of a third material between and separated from adjacent pairs of the lines of the second material, adjacent lines of the third material being discontinuous and having a thickness that is different from a thickness of the lines of the first material, and
   forming a cap layer, the cap layer encapsulating the lines of the first, second and third materials wherein, after forming the cap layer, the lines of the third material have a thickness that is at most 95% of the thickness of the lines of the first material.

2. The method of claim 1, wherein the lines of the first material have a pitch of 200 nm or less, and the first and third materials are different.

3. The method of claim 2, wherein forming the lines of the second material comprises:
   forming a continuous layer of the second material on the layer comprising the lines of the first material; and
   removing portions of the continuous layer of the second material to provide the lines of the second material.

4. The method of claim 3, wherein the continuous layer of the second material is formed using atomic layer deposition.

5. The method of claim 3, wherein the continuous layer of the second material conforms to a surface profile of the layer comprising the plurality of lines of the first material.

6. The method of claim 3, wherein removing the portions of the continuous layer of the second material comprises etching the layer of the second material.

7. The method of claim 1, wherein the second material has a refractive index of 1.8 or more and an extinction coefficient of 1.8 or more for a wavelength $\lambda$, that is 400 nm or less.

8. The method of claim 1, wherein the lines of the second material have a line width of 20 nm or less.

9. The method of claim 1, wherein the lines of the second material have a thickness of 100 nm or more.

10. The method of claim 1, wherein the lines of the second material have an aspect ratio of 5:1 or more.

11. The method of claim 1, wherein forming the lines of the third material comprises:
    forming a continuous layer of a fourth material over the lines of the second material; and
    forming a layer of the third material over the layer of the fourth material,
    wherein the second and third materials are different from the fourth material.

12. The method of claim 11, wherein forming the lines of the third material further comprises removing portions of the continuous layer of the third material to provide the lines of the third material.

13. The method of claim 11, wherein the third material is the same as the second material.

14. The method of claim 13, wherein the second material has a refractive index of 1.8 or more and an extinction coefficient of 1.8 or more for a wavelength $\lambda$ that is 400 nm or less.

15. The method of claim 1, wherein the lines of the third material have a line width of 20 nm or less.

16. The method of claim 1, wherein the lines of the third material have a thickness that is different from a thickness of the lines of the second material.

17. The method of claim 16, wherein the thickness of the lines of the second material is greater than the thickness of the lines of the third material.

* * * * *